United States Patent
Eltayeb et al.

(10) Patent No.: US 9,567,678 B2
(45) Date of Patent: Feb. 14, 2017

(54) METHODS AND SYSTEMS FOR CARRYING OUT A PH-INFLUENCED CHEMICAL AND/OR BIOLOGICAL REACTION

(71) Applicant: Massachusetts Institute of Technology, Cambridge, MA (US)

(72) Inventors: Aly Eldeen O. Eltayeb, Cambridge, MA (US); Michael C. Stern, Cambridge, MA (US); Trevor Alan Hatton, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 51 days.

(21) Appl. No.: 14/506,384

(22) Filed: Oct. 3, 2014

(65) Prior Publication Data
US 2015/0110694 A1  Apr. 23, 2015

Related U.S. Application Data

(63) Continuation-in-part of application No. 13/598,321, filed on Aug. 29, 2012, now Pat. No. 9,302,219.
(Continued)

(51) Int. Cl.
| | |
|---|---|
| *C25B 9/08* | (2006.01) |
| *C25B 11/04* | (2006.01) |
| *B01D 53/62* | (2006.01) |
| *B01J 19/08* | (2006.01) |
| *B01J 19/00* | (2006.01) |

(Continued)

(52) U.S. Cl.
CPC ............... *C25B 9/08* (2013.01); *B01D 53/326* (2013.01); *B01D 53/62* (2013.01); *B01J 19/0086* (2013.01); *B01J 19/088* (2013.01); *C25B 11/04* (2013.01); *B01D 53/1475* (2013.01); *B01D 2252/20421* (2013.01); *B01D 2252/602* (2013.01); *B01D 2257/504* (2013.01); *B01D 2258/0283* (2013.01); *B01D 2259/80* (2013.01); *B01J 2219/00177* (2013.01); *B01J 2219/0805* (2013.01); *Y02C 10/04* (2013.01)

(58) Field of Classification Search
None
See application file for complete search history.

(56) References Cited

U.S. PATENT DOCUMENTS

| | | |
|---|---|---|
| 3,065,156 A | 11/1962 | Wade et al. |
| 3,554,691 A | 1/1971 | Kuo et al. |

(Continued)

FOREIGN PATENT DOCUMENTS

| | | |
|---|---|---|
| EP | 0 328 782 A1 | 8/1989 |
| WO | WO 93/07650 A1 | 4/1993 |
| WO | WO 2013/033173 | 3/2013 |

OTHER PUBLICATIONS

Appel et al., Concentration of carbon dioxide by electrochemically modulated complexation with a binuclear copper complex. Inorg Chem. May 2, 2005;44(9):3046-56.
(Continued)

*Primary Examiner* — Harry D Wilkins, III
(74) *Attorney, Agent, or Firm* — Wolf, Greenfield & Sacks, P.C.

(57) ABSTRACT

The present invention generally relates to methods and systems for carrying out a pH-influenced chemical and/or biological reaction. In some embodiments, the pH-influenced reaction involves the conversion of $CO_2$ to a dissolved species.

12 Claims, 14 Drawing Sheets

Related U.S. Application Data

(60) Provisional application No. 61/528,449, filed on Aug. 29, 2011.

(51) Int. Cl.
*B01D 53/32* (2006.01)
*B01D 53/14* (2006.01)

(56) References Cited

U.S. PATENT DOCUMENTS

| | | | | |
|---|---|---|---|---|
| 4,789,610 | A * | 12/1988 | Kondo | H01M 4/581 252/182.1 |
| 5,324,403 | A | 6/1994 | Kennedy et al. | |
| 5,478,448 | A | 12/1995 | Schneider | |
| 6,129,832 | A | 10/2000 | Fuhr et al. | |
| 6,660,071 | B2 | 12/2003 | Yoshida et al. | |
| 7,381,648 | B2 | 6/2008 | Kaufman et al. | |
| 7,887,694 | B2 | 2/2011 | Constantz et al. | |
| 9,302,219 | B2 | 4/2016 | Stern et al. | |
| 2008/0171268 | A1 | 7/2008 | Yazami | |
| 2010/0059377 | A1 | 3/2010 | Littau et al. | |
| 2010/0236242 | A1 | 9/2010 | Farsad et al. | |
| 2012/0055808 | A1* | 3/2012 | Martin | B01D 53/1425 205/763 |
| 2013/0058857 | A1 | 3/2013 | Stern et al. | |
| 2014/0246324 | A1 | 9/2014 | Baskaran et al. | |
| 2014/0271434 | A1* | 9/2014 | Buttry | C01B 31/20 423/226 |
| 2016/0114290 | A1 | 4/2016 | Stern et al. | |

OTHER PUBLICATIONS

Eltayeb et al., Electrochemically-Mediated Amine Recovery (EMAR) for Large-Scale CO2 Capture. University of Texas 2nd Conference on Carbon Capture and Storage, Austin TX. Jan. 2014: 25 pages.
Eltayeb et al., Energetics of Electrochemically-Mediated Amine Regeneration. International Conference on Greenhouse Gas Technologies (GHGT-12), Austin TX. Oct. 2014: 26 pages.
Eltayeb et al., Energetics of Electrochemically-Mediated Amine Regeneration. Energy Procedia. 2014;63:595-604. doi:10.1016/j.egypro.2014.11.064.
Eltayeb et al., Energetics of Electrochemically-Mediated Amine Regeneration. MIT Carbon Sequestration Forum, Cambridge MA. Nov. 2014: 20 pages.
Eltayeb et al., High-Efficiency Carbon Dioxide Capture. MIT Deshpande Center Open House Poster, Cambridge MA. Dec. 9, 2014.
Frasconi et al., Electrochemically stimulated pH changes: a route to control chemical reactivity. J Am Chem Soc. Feb. 17, 2010;132(6):2029-36. doi: 10.1021/ja9094796.
Guin et al., Electrochemical Reduction of Quinones in Different Media: A Review. International Journal of Electrochemistry. 2011, Article ID 816202: 22 pages.
Okano et al., A new method of pH control by use of a polypyrrole coated electrode. J Electroanal Chem. Apr. 25, 1985;185(2):393-9.
Pascal et al., New concept to remove heavy metals from liquid waste based on electrochemical pH-switchable immobilized ligands. Applied Surface Science. 2007;253:3263-9.
Quan et al., Voltammetry of quinones in unbuffered aqueous solution: reassessing the roles of proton transfer and hydrogen bonding in the aqueous electrochemistry of quinones. J Am Chem Soc. Oct. 24, 2007;129(42):12847-56. Epub Oct. 2, 2007.
Sawai et al., Electrical control of the volume of pH-sensitive micro-gels. J Electroanal Chem. Jan. 25, 1991;297(2):399-407.
Sawai et al., Electrical modulation of the solution pH near polyaniline and its composite electrodes. J Electroanal Chem. Apr. 25, 1990;283(1-2):221-30.
Scovazzo et al., Electrochemical Separation and Concentration of <1% Carbon Dioxide from Nitrogen. Journal of the Electrochemical Society. Apr. 2003;150(5):D91-8.
Spinu et al., Electrochemical pH Control in Hydroponic Systems. Acta Hort. (ISHS). 1998;456:275-82. http://www.actahort.org/books/456/456_32.htm.
Stauffer, A new way to capture CO2 emissions: Lower costs, easier installation. MIT Energy Initiative, Energy Futures. Spring 2014: 19-23. Last accessed at <https://mitei.mit.edu/publications/energy-futures-magazine/energy-futures-spring-2014> Dec. 29, 2014.
Stern et al., An Electrochemically-Mediated Gas Separation Process for Carbon Abatement. Energy Procedia. 2013;37:1172-9. doi:10.1016/j.egypro.2013.05.214.
Stern et al., Electrochemical Redox Flow Devices for the Electrically Driven Scrubbing of Acid Gases. AIChE Fall 2011 Conference, Minneapolis, MN, Oct. 20, 2011.
Stern et al., Electrochemical Strategies for Reduction of Greenhouse Gas Emissions. AIChE Annual Meeting, San Francisco CA. Nov. 2013: 16 pages.
Stern et al., Electrochemically Mediated Separation for Carbon Capture. Energy Procedia. 2011;4:860-7. doi:10.1016/j.egypro.2011.01.130.
Stern et al., Electrochemically-Mediated Amine Regeneration (EMAR) for CO2 Separation. ACS Fall Meeting, Industrial and Engineering Chemistry Division, Graduate Student Award Symposium, Indianapolis, IN. Sep. 10, 2013.
Stern et al., Electrochemically-Mediated Amine Regeneration (EMAR) for CO2 Separation. ACS Spring 2013 Meeting, New Orleans, LA. Apr. 7, 2013.
Stern et al., Electrochemically-Mediated Amine Regeneration for Carbon Dioxide Scrubbing Processes. AIChE Fall 2012 Conference, Pittsburgh, PA, Oct. 29, 2012. No. 272305.
Stern et al., Electrochemically-Mediated Amine Regeneration for CO2 Separation from Flue Gases. ARPA-e Showcase Poster Presentation. Washington, DC. Feb. 25-27, 2013.
Stern et al., Electrochemically-Mediated Separations for Carbon Mitigation. US Department of Energy, National Energy Technology Laboratory CO2 Capture Technology Meeting. Poster Presentation. Pittsburgh, Pennsylvania. Aug. 22-26, 2011.
Stern et al., Post-Combustion Carbon Dioxide Capture Using Electrochemically Mediated Amine Regeneration. Energy Environ Sci. 2013;6(8):2505-17. doi:10.1039/C3EE41165F.
Stern et al., Taking Charge of Carbon Capture E-MAR (Electrochemically-Mediated Amine Regeneration). ARPA-e Showcase Poster Presentation. Washington, DC. Feb. 27-29, 2012.
Stern et al., What is an Electrochemically Mediated Separation Process? ARPA-e Showcase Poster Presentation. Washington, DC. Feb. 28-Mar. 2, 2011.
Stern, A graduate student's perspective on carbon mitigation. Separations Technology VIII, Kona, HI, Dec. 10, 2010.
Stern, Electrochemically-Mediated Amine Regeneration for Carbon Dioxide Separations. Doctoral Thesis, Massachusetts Institute of Technology. Feb. 2014.
Xu et al., Design and Synthesis of a New Conjugated Polyelectrolyte as a Reversible pH Sensor. Macromolecular Rapid Communications. Mar. 3, 2008;29(5):390-5.
Yeh et al., Removal of Cu-EDTA compounds via electrochemical process with coagulation. Water Research. Feb. 1995;29(2):597-9.
International Search Report and Written Opinion for PCT/US2012/052811 mailed Dec. 14, 2012.
International Preliminary Report on Patentability for PCT/US2012/052811 mailed Mar. 13, 2014.
International Search Report and Written Opinion for Application No. PCT/US2015/053743 mailed Jan. 20, 2016.

* cited by examiner

US 9,567,678 B2

METHODS AND SYSTEMS FOR CARRYING OUT A PH-INFLUENCED CHEMICAL AND/OR BIOLOGICAL REACTION

RELATED APPLICATIONS

This application is a continuation-in-part of U.S. patent application Ser. No. 13/598,321, filed Aug. 29, 2012, by Stern et al., which claims the benefit of U.S. Provisional Patent Application Ser. No. 61/528,449, filed Aug. 29, 2011, by Stern et al., each of which are herein incorporated by reference.

GOVERNMENT FUNDING

This invention was made with government support under Contract Nos. DE-AR0000083 and DE-PI0000017 awarded by the U.S. Department of Energy. The government has certain rights in the invention.

FIELD OF THE INVENTION

The present invention generally relates to methods and systems for carrying out a pH-influenced chemical and/or biological reaction. In some embodiments, the pH-influenced reaction involves the conversion of $CO_2$ to a dissolved species.

BACKGROUND OF THE INVENTION

A large number of chemical and biological reactions are pH-influenced. That is, the pH of a reaction environment influences the rate, selectivity, etc., of the chemical and/or biological reaction. Current methods/systems for controlling the pH of a reaction environment include sequential addition of an acid and/or base and selective water hydrolysis (e.g., with use of a membrane). However, current methods/systems have many disadvantages, including the need to replenish reagents (e.g., acid and/or base), inaccurate and/or imprecise pH changes, and irreversibility. Accordingly, improved methods and/or systems are needed.

SUMMARY OF THE INVENTION

In some embodiments, a system for carrying out a pH-influenced chemical and/or biological reaction is provided comprising a pH-adjustment zone comprising a solution containing a complexation agent capable of associating and/or disassociating an acid and/or base to and/or from the solution upon exposure to an electrical potential; and a reaction zone in fluid connection with the pH adjustment zone, wherein the reaction zone comprises components and reagents for carrying out a pH-influenced chemical and/or biological reaction.

In some embodiments, a system for carrying out a pH-influenced chemical and/or biological reaction is provided comprising a pH-adjustment zone, comprising a solution and an electrode exposed to the solution, wherein at least 30% of the electrode by weight comprises a complexation agent capable of associating and/or disassociating an acid and/or base to and/or from the solution upon exposure to an electrical potential; and a reaction zone in fluid connection with the pH-adjustment zone, wherein the reaction zone comprises components and reagents for carrying out a pH-influenced chemical and/or biological reaction.

In some embodiments, a system is provided comprising a pH-adjustment zone comprising a solution and a complexation agent in contact with the solution, wherein the complexation agent is capable of associating and/or disassociating an acid and/or base to and/or from the solution upon exposure to an electrical potential; and a reaction zone in fluid communication with the pH-adjustment zone, wherein the reaction zone comprises a $CO_2$ absorption column.

In some embodiments, a method is provided comprising providing a system comprising a pH-adjustment zone and a reaction zone in fluid connection with the pH-adjustment zone, wherein the pH-adjustment comprises a complexation agent and wherein the reaction zone comprises components and reagents for carrying out a pH-influenced chemical and/or biological reaction; exposing the complexation agent in the pH-adjustment zone to an electrical potential, wherein the complexation agent associates and/or disassociates an acid and/or base to and/or from the solution upon exposure to the electrical potential and causes the pH of the solution to increase or decrease, thereby forming a pH-selected solution having a selected pH; and flowing the pH-selected solution to the reaction zone, wherein the chemical and/or biological reaction is influenced by the pH of the pH-selected solution, and wherein the chemical and/or biological reaction causes the pH of the pH-selected solution to decrease or increase.

In some embodiments, a method is provided comprising providing a system comprising a pH-adjustment zone and a reaction zone in fluid connection with the pH-adjustment zone, wherein the pH-adjustment comprises a complexation agent and wherein the reaction zone comprises components and reagents for carrying out a pH-influenced reaction involving the conversion of $CO_2$ to a dissolved species; exposing the complexation agent in the pH-adjustment zone to an electrical potential, wherein the complexation agent associates and/or disassociates an acid and/or base to and/or from the solution upon exposure to the electrical potential and causes the pH of the solution to increase or decrease, thereby forming a pH-selected solution having a selected pH; and flowing the pH-selected solution to the reaction zone, wherein the pH-influenced reaction involving the conversion of $CO_2$ to a dissolved species is influenced by the pH of the pH-selected solution, and wherein the reaction causes the pH of the pH-selected solution to decrease or increase.

In some embodiments, a system for carrying out a pH-influenced chemical and/or biological reaction is provided comprising a pH-adjustment zone comprising a solution containing a complexation agent capable of associating and/or disassociating an acid and/or base to and/or from the solution upon exposure to an electrical potential, wherein the solution comprises at least one additive; and a reaction zone in fluid connection with the pH adjustment zone, wherein the reaction zone comprises components and reagents for carrying out a pH-influenced chemical and/or biological reaction.

In some embodiments, a system for carrying out a pH-influenced chemical and/or biological reaction is provided comprising a pH-adjustment zone comprising a solution and a porous electrode, wherein the solution contains a complexation agent capable of associating and/or disassociating an acid and/or base to and/or from the solution upon exposure to an electrical potential, and wherein at least a portion of the complexation agent intercalates into and/or de-intercalates from the electrode during operation of the system; and a reaction zone in fluid connection with the pH-adjustment zone, wherein the reaction one comprises components and reagents for carrying out a pH-influenced chemical and/or biological reaction.

In some embodiments, a method is provided comprising providing a system comprising a pH-adjustment zone and a reaction zone in fluid connection with the pH-adjustment zone, wherein the pH-adjustment comprises a complexation agent and wherein the reaction zone comprises components and reagents for carrying out a pH-influenced chemical and/or biological reaction, and wherein the system further comprises at least one additive; exposing the complexation agent in the pH-adjustment zone to an electrical potential, wherein the complexation agent associates and/or disassociates an acid and/or base to and/or from the solution upon exposure to the electrical potential and causes the pH of the solution to increase or decrease, thereby forming a pH-selected solution having a selected pH; and flowing the pH-selected solution to the reaction zone, wherein the chemical and/or biological reaction is influenced by the pH of the pH-selected solution, and wherein the chemical and/or biological reaction causes the pH of the pH-selected solution to decrease or increase.

In some embodiments, a method is provided comprising providing a system comprising a pH-adjustment zone and a reaction zone in fluid connection with the pH-adjustment zone, wherein the pH-adjustment comprises a complexation agent and wherein the reaction zone comprises components and reagents for carrying out a pH-influenced chemical and/or biological reaction, and wherein the system comprises at least one porous electrode; exposing the complexation agent in the pH-adjustment zone to an electrical potential, wherein the complexation agent associates and/or disassociates an acid and/or base to and/or from the solution upon exposure to the electrical potential and causes the pH of the solution to increase or decrease, thereby forming a pH-selected solution having a selected pH, and wherein at least a portion of the complexation agent intercalates into and/or de-intercalates from the porous electrode during the exposing step; and flowing the pH-selected solution to the reaction zone, wherein the chemical and/or biological reaction is influenced by the pH of the pH-selected solution, and wherein the chemical and/or biological reaction causes the pH of the pH-selected solution to decrease or increase.

For any of the methods and systems described above, the system may further comprise at least one additive.

For any of the methods and systems described above, an electrode may be utilized, wherein the electrode comprises a porous material. In some embodiments, the complexation agent may intercalate and/or de-intercalate into the porous material (e.g., during exposure to an electric potential).

For any of the methods and systems described above, the reaction zone may comprise components and reagents for carrying out a pH-influenced reaction involving the conversion of $CO_2$ to a dissolved species.

For any of the methods and systems summarized above, the acid may be a proton.

For any of the methods and systems summarized above, the base may be a hydroxide.

For any of the methods and systems summarized above, the pH of the pH-selected solution is may be about 1, about 2, about 3, about 4, about 5, about 6, about 7, about 8, about 9, about 10, about 11, about 12, or about 13.

For any of the methods and systems summarized above, the pH-adjustment zone may comprises a first electrode and a second electrode. In some embodiments, the first electrode and/or the second electrode may be porous. In some embodiments, the first electrode may be in a first compartment and the second electrode may be in a second compartment. In some embodiments, the first compartment and the second compartment may be separated by a membrane. In some embodiments, the membrane is an ion-selective membrane.

For any of the methods and systems summarized above, the pH-adjustment zone and the reaction zone may comprise a first container and a second, different, container. Alternatively, in some embodiments, the pH-adjustment zone and the reaction zone are comprised in the same container.

For any of the methods and systems summarized above, the pH-influenced biological and/or chemical reaction may involve the conversion of $CO_2$ to a dissolved species.

For any of the methods and systems summarized above, the change in pH of the solution may not be due to water electrolysis.

For any of the methods and systems summarized above, the complexation agent may be a solute in the solution.

For any of the methods and systems summarized above, the complexation agent may be at least 30%, at least 40%, at least 50%, at least 60%, at least 70%, at least 80%, at least 90%, at least 95%, at least 98%, or at least 99%, of an electrode by weight.

For any of the methods and systems described above, the complexation agent may be selected from the group consisting of:

$$PbSO_4 + 2H_2O \Leftrightarrow PbO_2 + SO_4^{2-} + 4H^+ + 2e^-$$

$$QH_2 \Leftrightarrow Q + 2H^+ + 2e^-, \text{ wherein } Q=\text{quinone}$$

$$QH_2 + 2OH^- \Leftrightarrow Q + 2H_2O + 2e^-, \text{ wherein } Q=\text{quinone}$$

$$Cu + 2OH^- \Leftrightarrow CuO + H_2O + 2e^-$$

$$Cu \Leftrightarrow Cu^{2+} + 2e^-$$

$$Cu^{2+} + 2OH^- \Leftrightarrow Cu(OH_2)$$

$$Cu + 2OH^- \Leftrightarrow Cu(OH)_2 + 2e^-$$

$$O_2 + H_2O + 4e^- \Leftrightarrow 4OH^-$$

$$2Cu + O_2 + H_2O \Leftrightarrow 2Cu(OH)_2 \text{ or}$$

$$2Fe + O_2 + H_2O \Leftrightarrow 2Fe(OH)_2$$

For any of the methods and systems summarized above, the system may comprise a first type of complexation agent and a second type of complexation agent.

Figure 1:
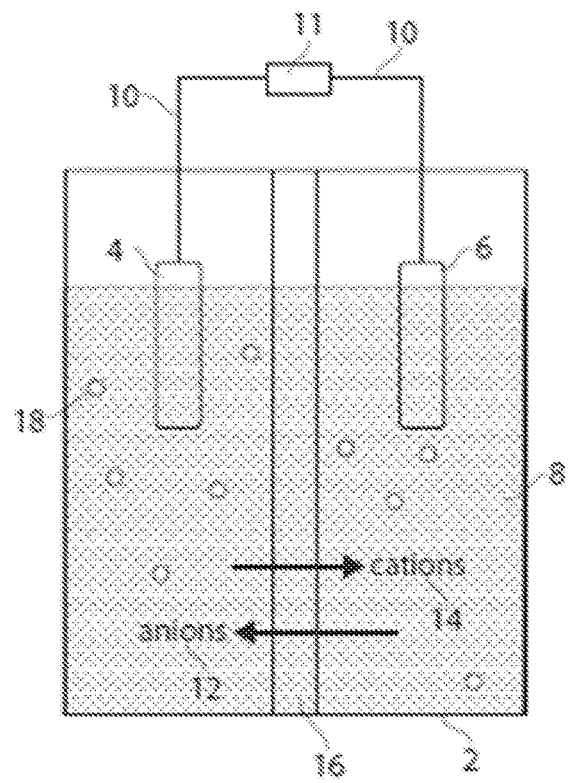
FIG. 1- FIG.3 depict non-limiting systems of the present invention, according to some embodiments.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally relates to methods and systems for carrying out a pH-influenced chemical and/or biological reaction. In some embodiments, the pH-influenced reaction involves the conversion of $CO_2$ to a dissolved species.

In some embodiments, the systems/methods described herein, through use of a chemically reversible Faradaic reaction of a complexation agent, modify the pH of a solution in contact with the complexation agent. In some cases, the complexation agent is capable of associating and/or disassociating an acid and/or a base to and/or from the solution upon exposure to an electrical potential, which in turns increases or decreases the pH of the solution. In some cases, the acid is a proton and/or the base is a hydroxide. Generally, the complexation agent is electrochemically active, that is, the complexation agent is stable in both an oxidized and reduced state. Additionally, the complexation agent may have dissimilar affinities for either acids (e.g., protons) or bases (e.g., hydroxides) when in different redox states.

In some cases, the complexation agent is capable of associating an acid from the solution upon exposure to an electrical potential, which in turns increases the pH of the solution. In some cases, the complexation agent is capable of dissociating an acid to the solution upon exposure to an electrical potential, which in turns decreases the pH of the solution. In some cases, the complexation agent is capable of associating a base from the solution upon exposure to an electrical potential, which in turns decreases the pH of the solution. In some cases, the complexation agent is capable of dissociating a base to the solution upon exposure to an electrical potential, which in turns increases the pH of the solution. In some cases, the acid is a proton. In some cases, the base is a hydroxide.

It should be understood, that while much of the discussion herein focuses on complexation agents which associate with an acid, the acid being a proton, this is by no means limiting, and those of ordinary skill in the art will be able to apply the teachings herein to systems/methods comprising a complexation agent which associates with a base, and/or with an acid being other than a proton.

In some embodiments, a system and/or a method of the present invention may operate as follow. In some cases, a solution is provided containing protons (or other acid) and is exposed to a complexation agent. An electrical potential can be applied to the complexation agent, which causes the complexation agent to associate with protons from the solution. The association of protons with the complexation agent causes the pH of the solution to increase (e.g., become more basic, as protons are being removed from the solution), wherein the electrical potential can be applied in such a manner that a desired number of protons are removed from the solution such that the pH of the solution reaches a selected pH and thus, a pH-selected solution is formed. The association may take place in a portion of the system termed a pH-adjustment zone. The pH-selected solution may then be used to influence the pH-influenced chemical and/or biological reaction. This may be accomplished by providing the pH-selected solution to a portion of the system termed a reaction zone (which may be the same or different than the pH-adjustment zone), wherein reagents and components are present for carrying out a pH-influenced chemical and/or biological reaction. In some embodiments, during the reaction, the chemical and/or biological reaction causes the pH of the pH-selected solution to decrease (e.g., due to release of the acid, thus causing the solution to become more acidic). To maintain the pH of the in the reaction zone and/or the pH of the pH-selected solution, additional solution from the pH-adjustment zone may be provide to the reaction zone. The systems and/or methods may be operated in batch mode, in a semi-continuous mode, and/or a continuous mode.

The term "pH-influenced chemical and/or biological reaction," as used herein, refers to a chemical and/or biological reaction which is influenced by the pH of the solution of which the chemical and/or biological reaction is taken place in. By "influenced" is meant that at least one measureable parameter of the reaction is affected by the pH of the solution. Non-limiting parameters include the rate of the reaction, the selectivity of the reaction (e.g., percent of desired product versus side product(s); percent formation of desired stereoisomer, etc.), and/or the percent conversion of the reaction. As will be known to those of ordinary skill in the art, the pH of a solution for which a reaction is to take place can significantly affect the outcome of that reaction.

For example, for many reactions, if the solution is not in a selected pH range, the reaction may not occur or may be substantially slowed. Non-limiting examples of pH-influenced chemical and/or biological reactions are described herein. Those of ordinary skill in the art will be aware of suitable methods for determining whether a reaction is influenced by the pH of the reaction environment, including, but not limiting, comparison of similar reactions carried out under substantially similar conditions, with the exception of the pH, and monitoring the formation of a product and/or the type of product over time (e.g., using one or more analytical techniques including, but not limited to, HPLC, IR, NMR, etc.). In some cases, the reaction is a chemical reaction. In some cases, the reaction is a biological reaction.

As used herein, a complexation agent generally refers to an agent (e.g., chemical entity) which is capable of associating and/or dissociating an acid and/or a base upon exposure to an electrical potential. In some embodiments, the complexation agent is capable of associating with an acid or base upon exposure to a first electrical potential and is capable of dissociating the acid or base upon exposure to a second electrical potential which is more negative than the first electrical potential. Alternatively, in some embodiments, the complexation agent is capable of associating with an acid or base upon exposure to a first electrical potential and is capable of dissociating the acid or base upon exposure to a second electrical potential which is more positive than the first electrical potential. In some embodiments, the complexation agent is capable of associating an acid upon exposure to a first electrical potential and is capable of dissociating the acid upon exposure to a second electrical potential which is more negative than the first electrical potential. In some embodiments, the complexation agent is capable of associating a base upon exposure to a first electrical potential and is capable of dissociating the base upon exposure to a second electrical potential which is more negative than the first electrical potential. In some embodiments, the complexation agent is capable of associating an acid upon exposure to a first electrical potential and is capable of dissociating the acid upon exposure to a second electrical potential which is more positive than the first electrical potential. In some embodiments, the complexation agent is capable of associating a base upon exposure to a first electrical potential and is capable of dissociating the base upon exposure to a second electrical potential which is more positive than the first electrical potential. Generally, the complexation agent exhibits such reversible behavior upon exposure to different potentials.

In some embodiments, the association or disassociation of an acid or a base contained in a solution with the complexation agent causes the pH of the solution to change. For example, association of an acid with a complexation agent and/or disassociation of a base from a complexation agent causes the pH of the solution to become more positive (e.g., more basic), due to removal of the acid from and/or addition of the base to the solution. Alternatively, disassociation of an acid from a complexation agent or association of a base with a complexation agent causes the pH of the solution to become more negative (e.g., more acidic) due to addition of the acid to and/or removal of the base from the solution.

Accordingly, through application of a sufficient electric potential to system, the acidity or basicity of the solution can be controlled, wherein the pH of the solution is changed due to the association and/or dissociation of an acid and/or base with the complexation agent. It should be understood, however, that the change in the pH of the solution is substantially caused by this process (e.g., association and/or dissociation of an acid and/or base), and is generally not caused by the production of product(s) of an electrochemical reaction. That is, the pH of the solution is not changed due to the production of a new chemical entity formed by electrolysis of a material (e.g., other than the complexation agent). For example, previously, the pH of a solution has been changed due to application of a potential which caused electrolysis of water, wherein the pH of the solution near an anode becomes acidic and pH of the solution near a cathode becomes basic (e.g., due to the local production of water electrolysis products). In some embodiments, the change in pH of the solution is not due to the presence of products formed by water electrolysis. A benefit of the use of system wherein the pH can be changed by association and/or dissociation of an acid and/or base with a complexation agent is that the pH of the solution can easily be returned to its original state, simply by application of a second potential.

A number of non-limiting examples of systems of the present disclosure will now be described in more detail. In some cases, a system comprises a pH-adjustment zone and a reaction zone. The pH-adjustment zone and the reaction zone may be in the same container/area or the two zones may be different containers/areas which are in fluid connection with each other (e.g., such that a solution may be flow from the pH-adjustment zone to the reaction zone and vice versa). In some embodiments, the pH-adjustment zone comprises a first container and contains the complexation agent and the reaction zone comprises a second container different from the first container and which contains the components and reagents for carrying out a pH-influenced chemical and/or biological reaction The complexation agent may be contained in the solution, may be a portion of the electrode, and/or may be associated with an electrode. In some embodiments, the pH-adjustment zone comprises a solution containing a complexation agent capable of associating and/or disassociating a proton and/or hydroxide to and/or from the solution upon exposure to an electrical potential. In other embodiments, the complexation agent is associated with an electrode and/or forms the electrode such that the solution contains substantially no complexation agent. In yet another embodiment, the complexation agent is in solution and upon application of an electrical potential to the solution using an electrode, the complexation agent forms a material associated with the electrode and/or a solid in the solution wherein the solid can be contained in the pH-adjustment zone (e.g., by settling, filtration) and the pH-selected solution which is provided to the reaction zone contains essentially no complexation agent. In some cases, however, the complexation agent is selected such that the phase (e.g., solid, liquid, in solution) does not change upon application of a voltage. Complexation agents are described in more detail herein. In some embodiments, wherein a system is to be used for the conversion of gas (e.g., $H_2S$, $SO_2$, $CO_2$) to a dissolved species, the reaction zone may comprise an absorption column. In embodiments wherein a system is to be used for the conversion of $CO_2$ to a dissolved species, the reaction zone may comprise a $CO_2$ absorption column.

In some embodiments, a system comprises a pH-adjustment zone and a reaction zone which may be the same or different than the pH-adjustment zone, provided the pH-adjustment zone and the reaction zone are in fluid communication with each other. The pH-adjustment zone may comprise a solution and an electrode exposed to the solution, wherein at least 30% of the electrode by weight comprises a complexation agent (e.g., capable of associating and/or disassociating an acid and/or a base to and/or from the solution upon exposure to an electrical potential). The term "fluid communication" as used herein refers to two components or regions containing a fluid, where the components or regions are connected together (e.g., by direct contact, or via a line, pipe, tubing, etc.) so that a fluid can flow between the two components or regions. Therefore, two chambers which are in "fluid communication" can, for example, be connected together by a line between the two chambers, such that a fluid can flow freely between the two chambers.

FIG. 1 shows a non-limiting example of a system of the invention. In FIG. 1, the system comprises container 2, first electrode 4 (e.g., anode) in electrical communication with second electrode 6 (e.g., cathode) via circuit 10, and solution 8 in contact with both first electrode 4 and second electrode 6. Circuit 10 may optionally comprise circuit component 11, e.g., power source, resistor, and/or capacitor. The system also comprises ion-permeable membrane 16 separating first electrode 4 from second electrode 6, and which allows for anions 12 to move from the first electrode side to the second electrode side and/or cations 14 to move from the second electrode side the first electrode side. Ion-migration balances the electroneutrality between the first electrode and the second electrode sides. Solution 8 contains complexation agent 18 (represented by circles). The pH of the solution can be changed by application of an electrical potential (e.g., between the first electrode and/or second electrode) which causes the pH of the solution to 1) decrease or 2) increase, depending on whether the application of the electrical potential causes the complexation agent to 1) associate a base and/or dissociate an acid, or 2) associate an acid and/or dissociate a base, respectively. The pH of the solution can be changed to a desired pH, which upon reaching it influences the pH-influenced chemical and/or biological reaction. This type of system is generally employed for use with pH-influenced reactions which are carried out in batches. That is, a set amount of reagents are provided to the system. If the pH of the solution reaches an undesired level during the reaction, additional electrical potential may be applied to cause the complexation agent to associate and/or dissociate more of the acid and/or base in the solution. The pH-influenced reaction is carried out until the reaction reaches a certain completion, followed by isolation of the product(s). Following completion of the reaction, if the pH-influenced reaction causes the pH of the solution to change, additional electrical potential may be applied to cause the complexation agent to associate and/or dissociate more of the acid and/or base in the solution such that a second batch of reagents can be provided to the solution and the pH-influenced reaction can be carried out. Advantageously, the system may also be regenerated between batches by application of a second electrical potential, wherein application of a second electrical potential causes the complexation agent to return to its original form. It should be understood that a variation of a batch system may comprise use of more than one type of complexation agent. In some embodiments, a system may comprise a first type of complexation agent and a second type of complexation agent. As a specific example, in some embodiments, a first type of complexation agent is present on the anode side and a second type of complexation agent is present on the cathode side, wherein upon application of a voltage to the system, each of the first type and the second type of complexation agents associates and/or dissociates an acid and/or base in a complementary way, such that the pH of the solution increases or decreases. It should also be understood that the system in FIG. 1 could readily be employed in embodiments where the complexation agent forms the electrode or a portion of the electrode (e.g., a solid complexation agent).

Figure 2:
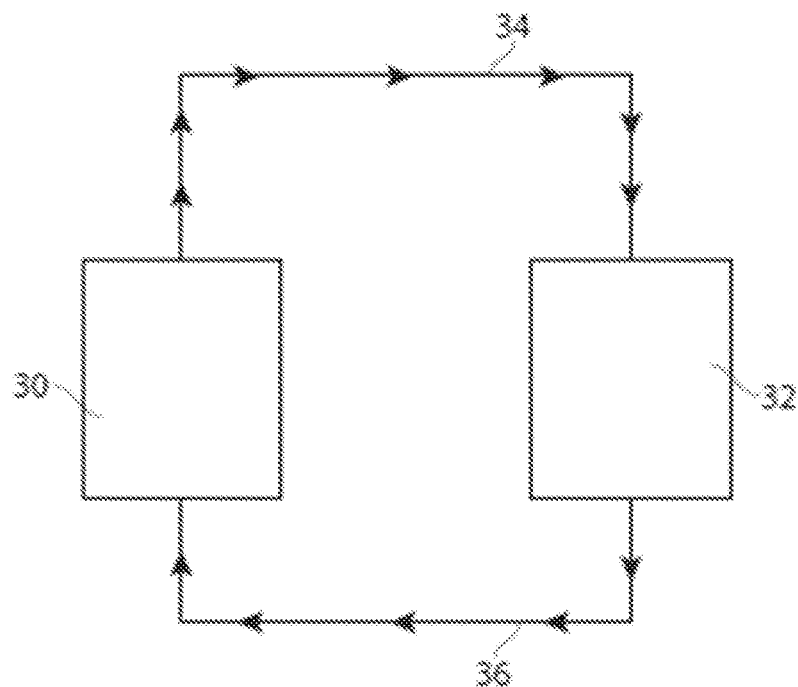

FIG. 2 illustrates another non-limiting example of a system of the invention. As opposed to the system in FIG. 1 which is generally employed for use with pH-influenced reactions which are carried out in batches, the system in FIG. 2 can be used to carry out semi-continuous and/or continuous reactions (e.g., wherein the reagents for the reaction are refreshed and/or the products of the reaction are removed while the system is in operation).

The system in FIG. 2 comprises pH-adjustment zone 30 which comprises a first container and reaction zone 32 which comprises a second container. pH-adjustment zone 30 is in fluid communication with reaction zone 32 via fluid conduits 34 and 36. pH-adjustment zone 30 contains the complexation agent (e.g., having a form as described herein) and components (e.g., first electrode, second electrode, power source, etc.) for applying an electrical potential to the complexation agent. In this embodiment, the pH-adjustment zone contains the components to carry out both halves of an electrochemical reaction or comprises the components to carry out one half of an electrochemical reaction and is associated with another device which is capable of balancing the electrochemical reaction (e.g., a capacitor, a second half cell). Reaction zone 32 contains the component and reagents necessary for carrying out a pH-influenced reaction. A solution may be flowed between the pH-adjustment zone and the reaction zone. In the pH-adjustment zone, the pH of the solution in the pH-adjustment zone may be adjusted to a selected pH (e.g., thereby forming a pH-selected solution) by applying an electrical potential which causes the complexation agent to associate and/or dissociate an acid and/or base. In the reaction zone, the pH-influenced reaction may be influenced by introduction of the pH-selected solution to the zone (e.g., via fluid conduit 34). The reaction may cause the pH of solution in the reaction zone to decrease or increase. When the pH in the reaction zone is not at the desired level, additional solution from the pH-adjustment zone can be provided thereby changing the pH of the solution in the reaction zone. Optionally, at least a portion of the solution in the reaction zone may be returned to the pH-adjustment zone (e.g., via conduit 36).

Figure 3:
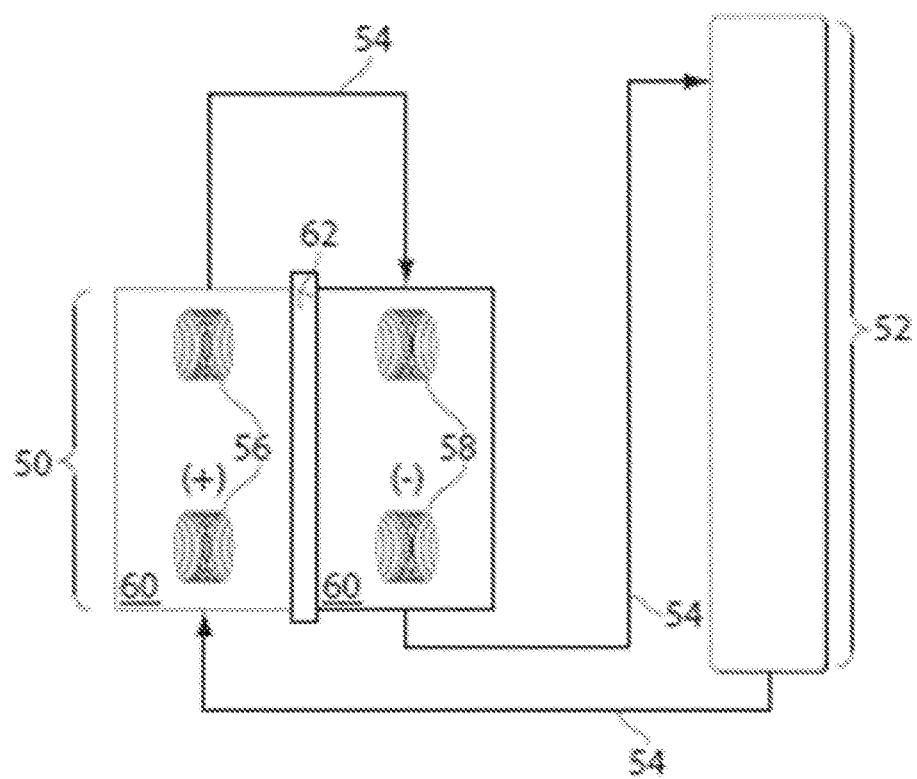

A specific example of a system as described in FIG. 2 is shown in FIG. 3. In FIG. 3, the system comprises pH-adjustment zone 50 and reaction zone 52 in fluid communication with the pH-adjustment zone by fluid conduits 54. pH-adjustment zone 50 comprises first electrode 56 (e.g., anode), second electrode 58 (e.g., cathode), solution 60, and membrane 62 (e.g., ion exchange membrane). In this figure, the complexation agent may be a portion of an electrode and/or may be contained in the solution. Upon application of a potential to the second electrode, the complexation agent dissociates an acid and/or base from the solution and thus the pH of the solution is changed to form a pH-selected solution. The pH-selected solution is flowed to reaction zone (e.g., via fluid conduits 54), wherein a pH-influenced reaction is carried out. In this example, the pH of the solution in the reaction zone is decreased or increased, and is flowed back into the pH-adjustment zone (e.g., via fluid conduit 54) wherein the pH of the solution can again be changed to a selected pH. See FIG. 6 described below for a more detailed description of a similar system for use in $CO_2$ conversion to a dissolved species.

In a non-limiting example of a complexation agent for use in FIG. 2, the second electrode may comprise $Cu(OH)_2$ (e.g., such that the reaction at the second electrode is $Cu(OH)_2+$ $2e^- \rightarrow Cu+2OH^-$) and the first electrode may comprise Cu (e.g., such that the reaction at the first electrode is $Cu+2OH^- \rightarrow Cu(OH)_2+2e^-$). As another non-limiting example, the complexation agent may be quinone and the reactions may be:

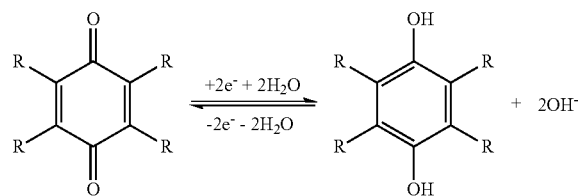

wherein each R can be the same or different and is a suitable substituent (e.g., hydrogen, alkyl, aryl, etc., each optionally substituted). In some embodiments, each R is the same or different and is hydrogen, optionally substituted alkyl, optionally substituted aryl, or optionally substituted heteroalkyl. In some embodiments, each R is the same or different and is H or optionally substituted alkyl. In some embodiments, each R is H.

Complexation agents will now be described in more detail. As noted above, the complexation agent may be provided in a solution (e.g., is soluble in the solution), may be a portion of the electrode, and/or may change phases depending on its environment (e.g., may be a solute at a first pH and a solid at a second pH). Generally, the complexation agent is a capable of associate and/or dissociating with an acid and/or a base upon application of an electrical potential to the complexation agent. In embodiments where a soluble complexation agent is employed, the agent may be reduced at the cathode and oxidized at the anode. As will be understood by those of ordinary skill in the art, if solutions are being added or removed, loss of the redox agent should be avoided, e.g., through appropriate separation techniques at any outlets. The agent is generally inactive or substantially inactive during the external pH dependent process. In some cases, a system/method may comprise more than one type of complexation agent (e.g., a first type of complexation agent and a second type of complexation agent different from the first type of complexation agent).

Those of ordinary skill in the art will be aware that each type of complexation agent will have a suitable pH range in which it is capable of affecting the pH of a solution to which it is exposed. For example, a first type of complexation agent may be capable of changing the pH of a solution between a pH of about 7 to a pH of about 3 and a second type of complexation agent may be capable of changing the pH of a solution between a pH of about 7 to a pH of about 10. In addition, each type of complexation agent may require a different range of electrical potentials to cause association and/or dissociation of an acid and/or base.

In some embodiments, the complexation agent may be used to change the pH of the solution from a pH of about 1, about 2, about 3, about 4, about 5, about 6, about 7, about 8, about 9, about 10, about 11, about 12, or about 13, by about 1 pH unit, about 2 pH units, about 3 pH units, about 4 pH units, about 5 pH units, about 6 pH units, about 7 pH units, about 8 pH units, about 9 pH units, about 10 pH units, about 11 pH units, or about 12 pH units. The pH of the pH-selected solution may be about 1, about 2, about 3, about 4, about 5, about 6, about 7, about 8, about 9, about 10, about 11, about 12, or about 13. In some embodiments, the pH of the pH-selected solution is between about 0 and about 14, or between about 1 and 13, or between about 1 and about 6, or between about 1 and 5, or between about 1 and about 4, or between about 1 and about 3, or between about 1 and about 2, or between about 0.1 and about 4, or between about 8 and about 13, or between about 9 and about 13, or between about 10 and about 13, or between about 11 and about 13, or between about 12 and about 13, or between about 10 and about 13.

In some cases, the association and/or dissociation of a pH requires an application of an electrical potential of about +/−0.1 volts, about +/−0.2 volts, about +/−0.3 volts, about +/−0.4 volts, about +/−0.5 volts, about +/−0.6 volts, about +/−0.7 volts, about +/−0.8 volts, about +/−0.9 volts, about +/−1 volts, about +/−1.1 volts, about +/−1.2 volts, about +/−1.3 volts, about +/−1.4 volts, about +/−1.5 volts, about +/−1.6 volts, about +/−1.7 volts about +/−1.8 volts, about +/−1.9 volts, about +/−2.0 volts, or about +/−2.5 volts. In some cases, the electrical potential is less than that required for the oxidation of water (e.g., -1.23 volts versus standard hydrogen electrode). In some embodiments, the application of the electrical potential is between about +/−0.1 and about +/−2.5 volts, or between about +/−0.1 and about +/−2 volts, or between about +/−0.1 and about +/−1.5 volts, or between about +/−0.1 and about +/−1 volts, or between about +/−0.5 and about +/−2.5 volts, or between about +/−0.5 and about +/−2 volts, or between about +/−1 and about +/−2.5 volts, or between about +/−1 and about +/−2 volts. Those of ordinary skill in the art will be aware of suitable methods and system for applying an electrical potential to a complexation agent (e.g., with use of a first electrode, a second electrode, and/or a power supply).

In some embodiments, the complexation agent is provided in a solution (e.g., to solution to be converted to a pH-selected solution). The concentration of the complexation agent in the solution may be about 0.1 M, about 0.2 M, about 0.3 M, about 0.4 M, about 0.5 M, about 0.6 M, about 0.7 M, about 0.8 M, about 0.9 M, about 1 M, about 1.2 M, about 1.4 M, about 1.5 M, about 1.75 M, about 2 M, about 2.5 M, about 3 M, about 4 M, about 5M, or greater. In some embodiments, the concentration of the complexation agent is between about 0.1 M and about 5 M, or between about 0.1 M and about 4 M, or between about 0.1 M and about 3 M, or between about 0.1 M and about 2 M, or between about 0.1 M and about 1 M, or between about 0.5 M and about 3 M, or between about 0.5 M and about 2 M.

In some embodiments, the complexation agent is provided as a solid. In some cases, the complexation agent may be formed on the surface of a substrate which is functioning as an electrode. In some cases, the electrode may comprise the complexation agent. In some cases, the electrode comprises the complexation agent, wherein at least about 10%, at least about 20%, at least about 30%, at least about 40%, at least about 50%, at least about 60%, at least about 70%, at least about 80%, at least about 90%, at least about 95%, at least about 98%, at least about 99%, or more, of the electrode by weight is the complexation agent.

The following equations describe non-limiting examples of complexation agents:

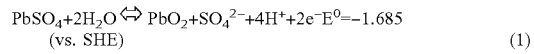 (1)

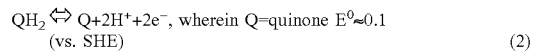 (2)

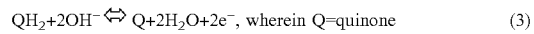 (3)

 (4)

$$Cu \Leftrightarrow Cu^{2+} + 2e^- \quad E^0 = -0.34 \text{ (vs. SHE)} \tag{5}$$

$$Cu^{2+} + 2OH^- \Leftrightarrow Cu(OH)_2 \quad K_{sp} = 2.2 \times 10^{20} \tag{6}$$

$$Cu + 2OH^- \Leftrightarrow Cu(OH)_2 + 2e^- \quad E^0 = 0.27 \text{ (vs. SHE)} \tag{7}$$

$$O_2 + H_2O + 4e^- \Leftrightarrow 4OH^- \quad E^0 = 0.4 \text{ (SHE)} \tag{8}$$

$$2Cu + O_2 + H_2O \Leftrightarrow 2Cu(OH)_2 \quad E^0 = 0.67 \text{ (SHE)} \tag{9}$$

$$2Fe + O_2 + H_2O \Leftrightarrow 2Fe(OH)_2 \quad E^0 = 1.34 \text{ (SHE)} \tag{10}$$

Figure 4:
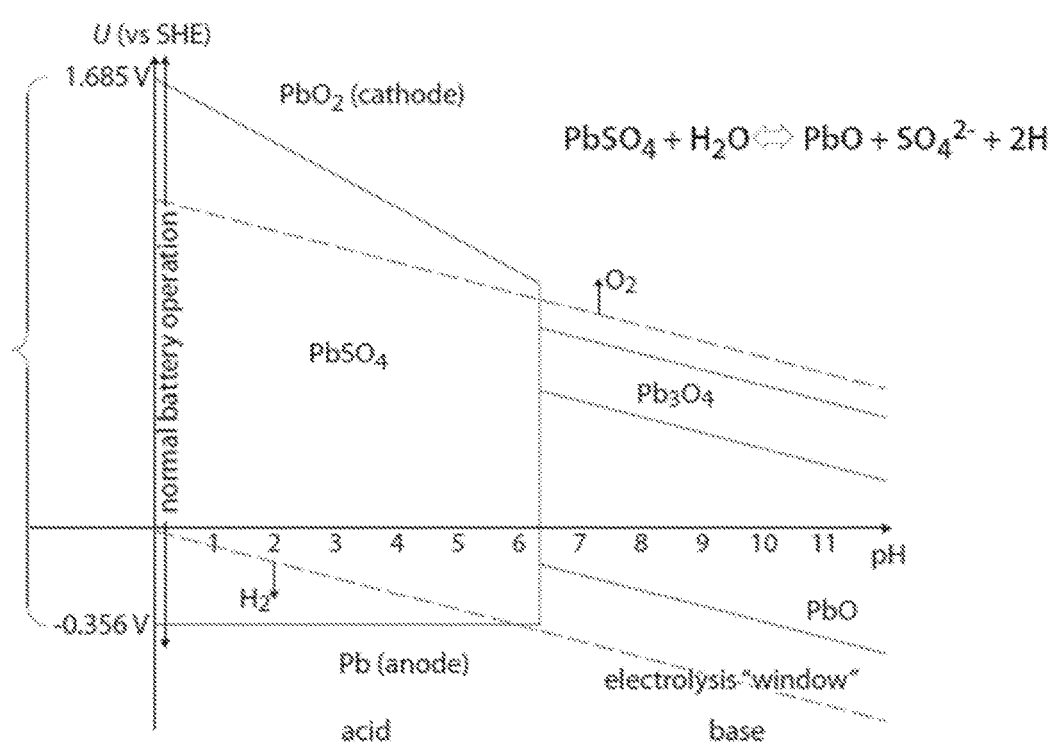
FIG. 4 shows a Pourbaix diagram for $PbSO_4$.
Figure 5:
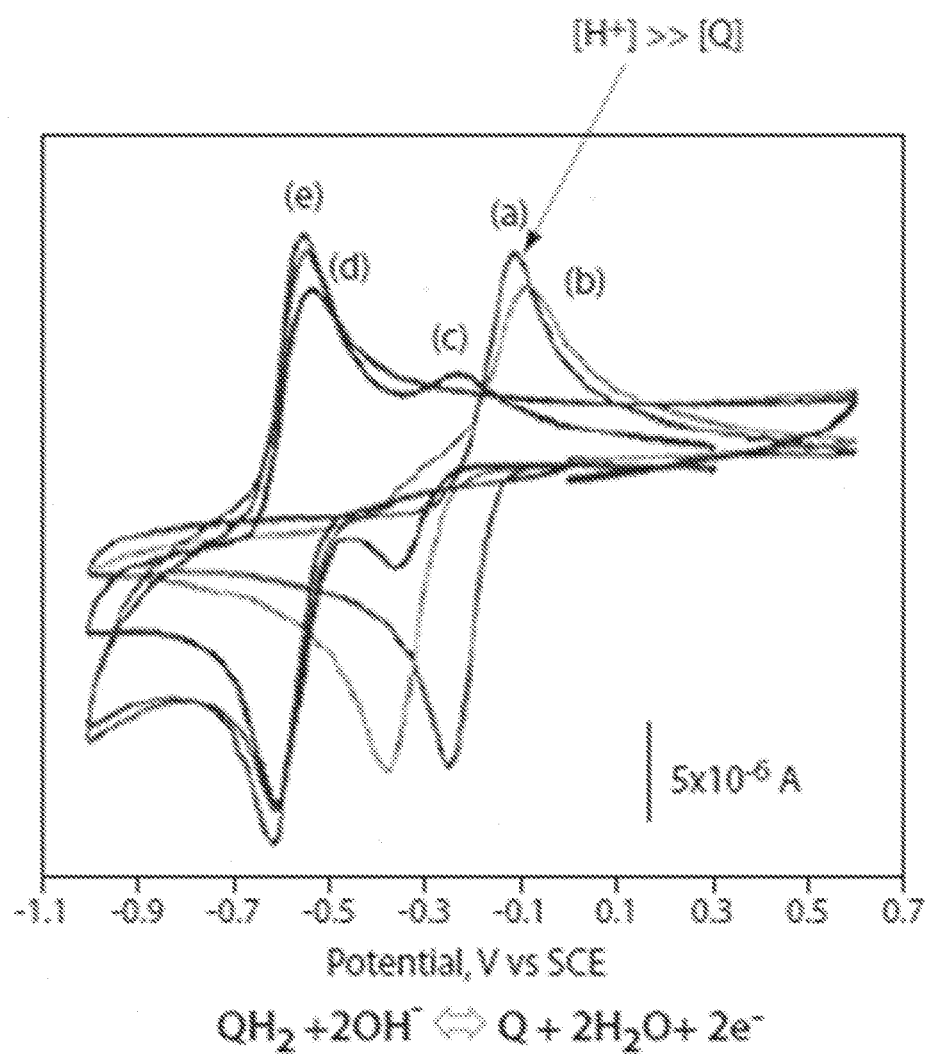
FIG. 5 shows cyclic voltammetry curves for an electrochemical reaction involving quinone.

The compounds in equation 1 may be useful to low pH ranges, the compounds in equations 2-3 may be useful for mid-pH ranges, and the compounds in equations 4-10 may be useful for high pH ranges. FIG. 4 shows a Pourbaix diagram (e.g., a potential/pH diagram) for the lead reaction shown in Equation 1. FIG. 5 shows cyclic voltammetry curves for the reaction in Equation 3. In some embodiments, the complexation agent is $PbSO_4$ and/or $PbO_2$; or $QH_2$ and Q, wherein Q is quinone, optionally substituted; or Cu and/or CuO; Cu and/or $Cu(OH)_2$; or $O_2$ and/or $OH^-$; or Fe and/or $Fe(OH)_2$.

In some embodiments, methods are provided. In one embodiment, a method comprises providing a system comprising a pH-adjustment zone and a reaction zone in fluid connection with the pH-adjustment zone, wherein the pH-adjustment comprises a complexation agent, and wherein the reaction zone comprises components and reagents for carrying out a pH-influenced chemical and/or biological reaction. The complexation agent in the pH-adjustment zone may be exposed to an electrical potential, wherein the complexation agent associates and/or disassociates an acid and/or a base to and/or from the solution upon exposure to the electrical potential and causes the pH of the solution to increase or decrease, thereby forming a pH-selected solution having a selected pH. This solution may be flowed to the reaction zone, wherein the chemical and/or biological reaction is influenced by the pH of the pH-selected solution, and wherein the chemical and/or biological reaction causes the pH of the pH-selected solution to decrease or increase. In another embodiment, a method comprises providing a system comprising a pH-adjustment zone and a reaction zone in fluid connection with the pH-adjustment zone, wherein the pH-adjustment comprises a complexation agent, and wherein the reaction zone comprises components and reagents for carrying out a pH-influenced reaction involving the conversion of $CO_2$ to a dissolved species. For example, the conversion of $CO_2$ may involve the capture, absorption, and/or dissolution of $CO_2$. In a particular embodiment, the conversion of $CO_2$ may involve capture of $CO_2$ with a base (e.g., an amine, ammonia) to form a dissolved species (e.g., a bicarbonate, a carbamate, etc.). The complexation agent in the pH-adjustment zone may be exposed to an electrical potential, wherein the complexation agent associates and/or disassociates an acid and/or a base to and/or from the solution upon exposure to the electrical potential and causes the pH of the solution to increase or decrease, thereby forming a pH-selected solution having a selected pH. This solution may be flowed to the reaction zone, wherein the pH-influenced reaction involving the conversion of $CO_2$ (e.g., to a dissolved species) is influenced by the pH of the pH-selected solution, and wherein the reaction causes the pH of the pH-selected solution to decrease or increase.

The systems and methods of the present invention may find application for carrying out a variety of pH-influenced reactions. For example, many biological reactions involving enzymes are pH sensitive. Applications of the systems/methods include, but are not limited to, acid or base catalysis, acid or basic gas scrubbing, regeneration of hydroxides from carbonates (e.g., currently done in paper pulp processing), and other pH dependent separations such as crystallization, actuation of pH responsive polymers, and sterilization.

In some embodiments, the systems and/or methods may be used in applications involving acid or base catalysts. For example, transesterification reactions and Aldol reactions in industry that require acidic or basic conditions in order to catalyze hydration or dehydration reactions.

In some embodiments, the systems and/or methods may be used in applications involving acid or basic gas scrubbing. Gas scrubbing is commonly employed to prevent the release of toxic chemicals (e.g., ammonia or hydrochloric acid) as well as greenhouse gases (e.g., carbon dioxide or sulfur dioxide) which are produced as byproduct in a variety of reactions. Acids and bases can be used as effective sorbents for these cases, for example, if the acid or base is a Lewis acid or a Lewis base, respectively.

In some embodiments, the systems and/or methods may be used in applications, wherein the pH-influenced reaction involves the conversion of $CO_2$ (e.g., to a dissolved species). Such systems provide many advantages over current methods, including lower costs, increased efficiency (e.g., due to the need for less heating), the ability to operate under higher pressures (if desired), and/or fewer side products. In addition, the system may be capable of being regenerated.

In some embodiments, a system/method for the capture of $CO_2$ from gaseous streams containing a mixture of gases is provided wherein at least a portion of the system/method comprises the conversion of $CO_2$ (e.g., to a dissolved species). Such system may comprise the use of an amine solution (e.g., a basic solution). When the amine is present in solution, the $CO_2$ and the amine can associate to form an amine-$CO_2$ complex (e.g., a carbamate) and thus the $CO_2$ has been converted to a dissolved species. Disassociation of the amine from the amine-$CO_2$ complex causes the $CO_2$ gas to reform. The amine may be provided to or removed from the solution by disassociating or associating with a complexation agent, respectively, which causes the pH of the solution to increase or decrease, respectively.

As a specific example of such a system, the process may comprise the complexation agents comprising copper. As will be known to those of ordinary skill in the art, Cu(II) is capable of coordinating with ligands containing amine and/or carboxylic acid groups. When removing Cu(II) from the solution, either Cu(I) species or Cu(0) could be formed to reduce the competition for $CO_2$.

A non-limiting set of reactions which may occur in a system for $CO_2$ conversion is provided below in Equations 11-14. In these equations, a primary amine (e.g., $RNH_2$, wherein R is alkyl, aryl, etc., each optionally substituted) is reversibly provided to and/or removed from a solution via disassociation or association with a complexation agent comprising copper, respectively, thereby changing the pH of the solution. It should be noted that the copper/amine complexes may also be associated with hydroxide anions, which are not shown here for clarity.

$$\text{Absorption: } 2RNH_2 + CO_2 \rightarrow RNHCOO^- + RNH_3^+ \tag{11}$$

$$\text{Activation: } Cu \rightarrow Cu^{2+} + 2e^- \tag{12}$$

$$\text{Desorption: } Cu^{+2} + RNH_3^+ + RNHCOO^- \rightarrow [Cu.(RNH_2)_2]^{+2} + CO_2 \tag{13}$$

$$\text{Regeneration: } [Cu.(RNH_2)_2]^{+2} + 2e^- \rightarrow Cu + 2RNH_2 \tag{14}$$

Figure 6:
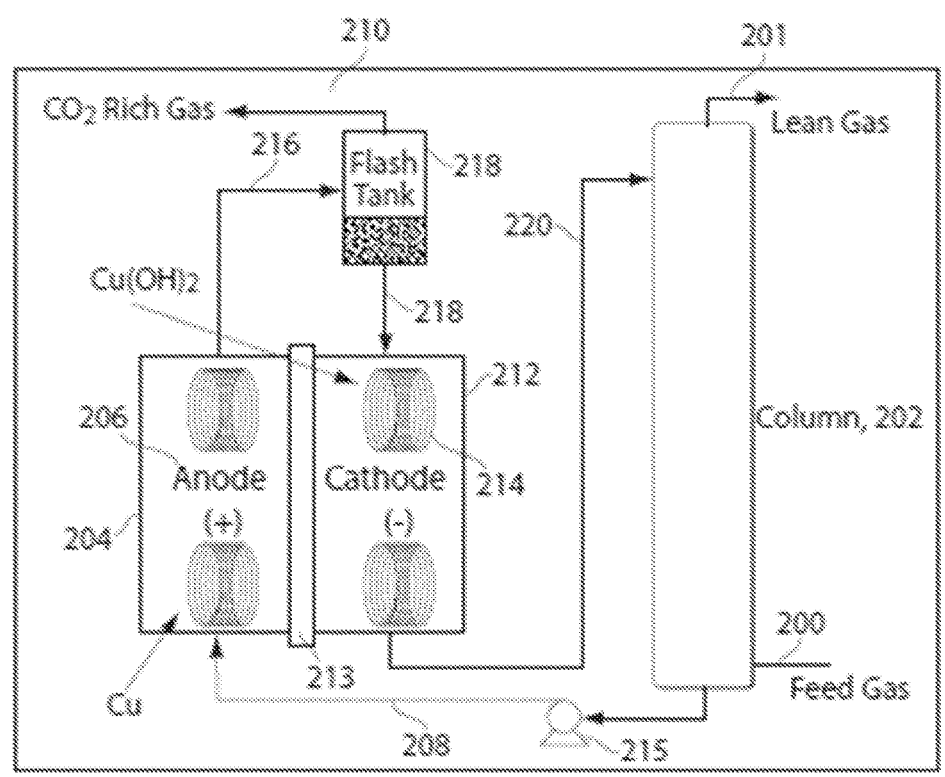
FIG. 6 depicts a non-limiting system of the present invention for use in the conversion of $CO_2$ to a dissolved species, according to some embodiments.

The system can operate as follows and as illustrated in FIG. 6. A feed gas comprising $CO_2$ and other gaseous materials (e.g., $N_2$) is provided by inlet 200 and is flowed through column 202 which comprises a primary amine and out through outlet 201. During the flow through the column comprising $RNH_2$, absorption occurs as per Equation 11, thereby forming $RNHCOO^-$. The resulting $RNHCOO^-$ (e.g., in solution) species is provided to anode container 204 containing anode 206. For example, $RNHCOO^-$ may be in a solution and may be flowed to anode container 204 via fluid connectors 208. The system may optionally comprise a pump (e.g., 215) which can be used to circulate the solution throughout the system. In this example, anode 206 comprises Cu(0). Upon application of an electrical potential to anode 206, Cu(II) ions may form (e.g., as per equation 12). The Cu(II) ions may react with the $RNHCOO^-$ present in solution (e.g., via Equation 13), thereby causing $CO_2$ to be released and $[Cu.(RNH_2)_2]^{+2}$ to form. This solution can be provided, optionally via flash tank 218 (e.g., to allow release and collection of $CO_2$ gas) to cathode container 212 comprising cathode 214. For example, a solution containing $[Cu.(RNH_2)_2]^{+2}$ of Equation 13 may be flown via fluid conduit 216 to flash tank 208 wherein the $CO_2$ rich gas may be collected (e.g., via outlet 210), followed by flowing the solution via fluid conduit 218 to cathode container 212. Cathode container 214 and anode container 204 may be optionally separated by membrane 213. In cathode container 212, application of an electric potential can cause $[Cu.(RNH_2)_2]^{+2}$ to dissociate, thereby reforming Cu(0) and regenerating the primary amine (e.g., via Equation 14). Accordingly, FIG. 6 illustrates a regenerable system for the collection of $CO_2$ gas. See also Example 1.

Those of ordinary skill in the art will be able to select other materials and reaction to which the above described systems/methods may be used. For example, while this example described use of an oxidized species in solution and a reduced species as a solid, those of ordinary skill in the art will be able to employ materials in which both the oxidized and reduces species are in solution. In some embodiments, an electrode may be utilized which comprises a different material than the complexation agent, and the complexation agent may be provided in solution and may associate and/or dissociate from the electrode during operation (e.g., via intercalation and/or de-intercalation). For example, the system may employ solutions comprising amines, the use of suspended copper and copper oxide particles with glassy carbon electrodes instead of Cu/CuO electrodes, and/or other complexation agents. During operation, copper may associate and/or dissociate (e.g., intercalate and/or de-intercalate) with one or more of the electrodes.

In some embodiments, an electrode is utilized comprising a porous material, wherein the complexation agent intercalates into and/or de-intercalated from the electrode during operation of a system and/or a method. The term intercalate is given its ordinary meaning in the art and refers to the ability of an ion (e.g., a complexation agent such as copper) to insert into an electrode. An ion is said to reversibly intercalate if it can de-intercalate (e.g., deinsert), without unduly stressing the electrode, so that electrode performance is maintained over repeated cycling. For example, in some embodiments, the electrode comprises a porous material and the complexation agent (e.g., comprising copper) reversibly intercalates into the electrode by plating on the surface (e.g., include any pores, if present). In some embodiments, both the anode and the cathode are constructed such that complexation agent reversibly intercalates.

In some embodiments, use of a porous electrode as an intercalation/de-intercalation material for the complexation agent provides many advantages over use of a solid electrode with a solubilized complexation agent and/or an electrode formed of the complexation agent. For example, utilizing a intercalation/de-intercalation material may significantly improve the cycling stability of a system and/or a method, as the porous structure improves order and/or reversibility of the system and/or method as compared to use of a solid electrode formed of the complexation material and/or an electrode formed of material other than the complexation agent, wherein the complexation agent associates and/or dissociates from the outer surface of the electrode (e.g., a non-porous electrode).

The porous electrode may be made of any suitable material and/or may comprise any suitable shape or size. In a non-limiting embodiment, the electrode comprises a porous carbonaceous material. The term carbonaceous material is given its ordinary meaning in the art and refers to a material comprising carbon or graphite that is electrically conductive. Non-limiting example of carbonaceous materials include carbon nanotubes, carbon fibers (e.g., carbon nanofibers), and/or graphite. It should be understood that an electrode that comprises a carbonaceous material may be an electrode which consists or consists essentially of the carbonaceous material, or may be an electrode in which only a portion of the electrode comprises a carbonaceous material. For example, at least a portion of the electrode in electrical contact with the electrolyte may comprise a carbonaceous material. In such embodiments, the electrode may be partially fabricated from the carbonaceous material or the carbonaceous material may be deposited over an underlying material. The underlying material generally comprises a conductive material, for example, a metal. Other non-limiting examples of conductive materials are described herein.

In some embodiments, an electrode is porous. The porosity of an electrode may be measured as a percentage or fraction of the void spaces in the photoactive electrode. The percent porosity of an electrode may be measured using techniques known to those of ordinary skill in the art, for example, using volume/density methods, water saturation methods, water evaporation methods, mercury intrusion porosimetry methods, and nitrogen gas adsorption methods. In some embodiments, the electrode may be at least about 10% porous, at least about 20% porous, at least about 30% porous, at least about 40% porous, at least about 50% porous, at least about 60% porous, or greater. The pores may be open pores (e.g., have at least one part of the pore open to an outer surface of the electrode and/or another pore) and/or closed pores (e.g., the pore does not comprise an opening to an outer surface of the electrode or another pore). In some cases, the pores of an electrode may consist essentially of open pores (e.g., the pores of the electrode are greater than at least 70%, greater than at least 80%, greater than at least 90%, greater than at least 95%, or greater, of the pores are open pores). In some cases, only a portion of the electrode may be substantially porous. For example, in some cases, only a single surface of the electrode may be substantially porous. As another example, in some cases, the outer surface of the electrode may be substantially porous and the inner core of the electrode may be substantially non-porous. In a particular embodiment, the entire electrode is substantially porous.

Generally, the systems/methods comprise at least one solution in which the pH-influenced chemical and/or biological reaction occurs. In some embodiments, the solution functions as an electrolyte. An electrolyte, as known to those of ordinary skill in the art, is any substance containing free ions that is capable of functioning as an ionically conductive medium. In some cases, the electrolyte is a liquid. In many embodiments, the solution comprises water. In some cases, the solution comprises mixtures of solvents, such as water, organic solvents, amines, and the like. In some cases, the starting pH of the solution is about neutral (e.g., prior to changing the pH by application of an electrical potential to the complexation agent). That is, the pH of the electrolyte may be between about 5.5 and about 8.5, between about 6.0 and about 8.0, about 6.5 about 7.5, and/or the pH is about 7.0. In a particular case, the pH is about 7.0. In other cases, the pH of the electrolyte is about neutral or acidic. In these cases, the pH may range from about 0 to about 8, about 1 to about 8, about 2 to about 8, about 3 to about 8, about 4 to about 8, about 5 to about 8, about 0 to about 7.5, about 1 to about 7.5, about 2 to about 7.5, about 3 to about 7.5, about 4 to about 7.5, about 5 to about 7.5. In yet other cases, the pH may be between about 6 and about 10, about 6 and about 11, about 7 and about 14, about 2 and about 12, and the like. In a specific embodiment, the pH is between about 6 and about 8, between about 5.5 and about 8.5, between about 5.5 and about 9.5, between about 5 and about 9, between about 3 and about 11, between about 4 and about 10, or any other combination thereof. In some embodiments, the solution comprises water, an amine (e.g., for association with copper), and one or more additives (e.g., a salt, as described in more detail herein). In some embodimetns, the amine is present in a concentration between about 0.5 M and about 5M, or between about 1 M and about 5 M, or between about 1M and about 3M, or about 2 M.

In some embodiments, the solution comprises one or more additives. Addition of the additives to the solution may have many benefits, for example, increasing energy efficiency of the electrochemical system and/or method, for example, the formation and removal of the complexation agent by electrochemical dissolution and deposition. Generally, the additive is not consumed by the reaction. In some embodiments, addition of one or more additives to the solution increases energy efficiency of the system by at least about 10%, or about 20%, or about 30%, or about 40%, or about 50%, or about 60%, or about 70%, or about 80%, or about 90%, or about 100%, as compared to a substantially similar system which does not comprise the one or more additives that is operated under substantially similar conditions. A non-limiting method for determining the energy efficiency of a system and/or the increase in the energy efficiency of a system upon a change in parameters (e.g., addition of an additive) is described herein, for example, see the Examples section. In some embodiment, the energy of capture for a method and/or system operated in the presence of an additive decreases by at least about 10%, or about 20%, or about 30%, or about 40%, or about 50%, or about 60%, or about 70%, or about 80%, or about 90%, or about 100% as compared an essentially similar method and/or system operated in the absence of the additive under essentially similar conditions. For example, in a system/method for capturing $CO_2$, wherein when the system was operated at about 1000 $A/m^2$, an activation overpotential of about 30 kJ/mole $CO_2$ captured was determined in the absence of an additive, whereas in the presence of an additive (e.g., a halide salt such as sodium chloride, sodium bromide, ammonium bromide, ammonium chloride,), the value decreased to about 10 - 15 kJ/mole (see, for example, Example 7).

In some embodiments, the additive is present in a concentration between about 0.5 M and about 5M, or between about 1 M and about 5 M, or between about 1M and about 3M, or about 2 M.

In some embodiments, the additive is a salt. In some embodiments, the additive comprises the structure $[M]^{p+}[X]^{p-}$ or $n[M]^{m+}m[X]^{n-}$, wherein $[M]p^+$ and $[M]^{m+}$ are cations, $[X]^{p-}$ and $[X]^{n-}$ are anions, each p is 1, 2, 3, or 4, and m and n are different and are 1, 2, 3, or 4. In some embodiments, each p is 1. In some embodiments, each p is 2. In some embodiments, the additive comprises an metal salt, for example, an alkali metal salt or an alkaline metal salt.

In some embodiments, $[M]^{p+}$ or $[M]^{m+}$ is an alkali metal ion. In some embodiments, $[M]^{p+}$ or $[M]^{m+}$ is an alkaline metal ion. In some embodiments, $[M]^{p+}$ or $[M]^{m+}$ is sodium. In some embodiments $[M]^{p+}$ or $[M]^{m+}$ is $NR_4^+$, wherein each R is the same or different and is hydrogen, optionally substituted alkyl, optionally substituted heteroalkyl, optionally substituted aryl, or optionally substituted heteroaryl. In some embodiments, $[M]^{p+}$ or $[M]^{m+}$ is $NH_4^+$. Other non-limiting examples of cations include $K^+$, $Li^+$, $Mg^{+2}$, $Ca^{+2}$, and $Sr^{+2}$.

In some embodiments, $[X]^{p-}$ or $[X]^{n-}$ is a halide. In some embodiments, $[X]^{p-}$ or $[X]^{n-}$ is bromide. In some embodiments, $[X]^{p-}$ or $[X]^{n-}$ is chloride. In some embodiments, $[X]^{p-}$ or $[X]^{n-}$ is carbonate. Other non-limiting embodiments of anions will be known to those of ordinary skill in the ar, for example, $CO_3^{-2}$, $SO_4^{-2}$, $SO_3^{-2}$, $PO_4^{-2}$, and $PO_3^{-3}$.

As a non-limiting embodiment, wherein the complexation comprises comprise the system/method utilizes an amine, an additive comprising sodium bromide or ammonium bromide may be utilized. In such embodiments, the energy efficiency of the system may increase by at least about 30%, or at least about 40%, or at least about 50%, or at least about 60%, or at least about 70%, or more, as compared to a substantially similar system which does not comprise the additive and is operated under substantially similar conditions.

The methods and/or systems may be utilized at any suitable temperature. In some embodiments, the methods and/or systems are operated at about room temperature (e.g., about 25° C. In some embodiments, the methods and/or systems are operated at a temperature between about 25° C. and about 100° C., or between about 25° C. and about 90° C., or between about 25° C. and about 80° C., or between about 25° C. and about 75° C., between about 25° C. and about 70° C.

Various components of a system, such as the electrode, power source, electrolyte, separator, container, circuitry, insulating material, gate electrode, etc. can be fabricated by those of ordinary skill in the art from any of a variety of components, as well as those described in any of those patent applications described herein. Components may be molded, machined, extruded, pressed, isopressed, infiltrated, coated, in green or fired states, or formed by any other suitable technique. Those of ordinary skill in the art are readily aware of techniques for forming components of system herein.

In some embodiments, a system comprises at least one electrode, or at least two electrode, or two electrodes. In some cases, an electrode comprises a complexation agent, as described herein. In embodiments, wherein the electrode is not formed of the complexation agent, an electrode may comprise any material that is substantially electrically conductive. The electrode may be transparent, semi-transparent, semi-opaque, and/or opaque. The electrode may be a solid, semi-porous or porous. Non-limiting examples of electrodes include indium tin oxide (ITO), fluorine tin oxide (FTO), glassy carbon, metals, lithium-containing compounds, metal oxides (e.g., platinum oxide, nickel oxide), graphite, nickel mesh, carbon mesh, and the like. Non-limiting examples of suitable metals include gold, copper, silver, platinum, nickel, cadmium, tin, and the like. In some instances, the electrode may comprise nickel (e.g., nickel foam or nickel mesh). The electrodes may also be any other metals and/or non-metals known to those of ordinary skill in the art as conductive (e.g., ceramics). The electrode may be of any size or shape. Non-limiting examples of shapes include sheets, cubes, cylinders, hollow tubes, spheres, and the like. The electrode may be of any size. Additionally, the electrode may comprise a means to connect the electrode to another electrode, a power source, and/or another electrical device.

Various electrical components of system may be in electrical communication with at least one other electrical component by a means for connecting. A means for connecting may be any material that allows the flow of electricity to occur between a first component and a second component. A non-limiting example of a means for connecting two electrical components is a wire comprising a conductive material (e.g., copper, silver, etc.). In some cases, the system may also comprise electrical connectors between two or more components (e.g., a wire and an electrode). In some cases, a wire, electrical connector, or other means for connecting may be selected such that the resistance of the material is low. In some cases, the resistances may be substantially less than the resistance of the electrodes, electrolyte, and/or other components of the system.

In some embodiments, a power source may supply DC voltage to a system. Non-limiting examples include batteries, power grids, regenerative power supplies (e.g., wind power generators, photovoltaic cells, tidal energy generators), generators, and the like. The power source may comprise one or more such power supplies (e.g., batteries and a photovoltaic cell). In a particular embodiment, the power supply is a photovoltaic cell.

In some embodiments, a system may comprise a separating membrane. A separating membrane may be made of suitable material, for example, a plastic film. Non-limiting examples of plastic films included include polyamide, polyolefin resins, polyester resins, polyurethane resin, or acrylic resin and containing lithium carbonate, or potassium hydroxide, or sodium-potassium peroxide dispersed therein. In some cases, the membrane may be an anion exchange membrane and/or cation exchange membrane (i.e., ones with anion and/or cation exchangeable ions) which are readily available from commercial sources. Non-limiting examples of anionic exchange membranes include poly (ethylene-co-tetrafluoroethylene), poly(hexafluoropropylene-co-tetrafluoroethylene), poly(epichlorhydrin-ally glycidyl ether), poly(ether imide), poly(ethersulfone) cardo, poly(2,6-dimethyl-1,4-phenylene oxide), polysulfone, or polyethersulfone, associated with a plurality of cationic species (e.g., quaternary ammonium groups, phosphonium groups, etc.).

A container may be any receptacle, such as a carton, can, or jar, in which components of a system may be held or carried. A container may be fabricated using any known techniques or materials, as will be known to those of ordinary skill in the art. For example, in some instances, the container may be fabricated from gas, polymer, metal, and the like. The container may have any shape or size, providing it can contain the components of the system. Components of the system may be mounted in the container. That is, a component (e.g., an electrode) may be associated with the container such that it is immobilized with respect to the container, and in some cases, is supported by the container. A component may be mounted to the container using any common method and/or material known to those skilled in the art (e.g., screws, wires, adhesive, etc.). The component may or might not physically contact the container. In some cases, an electrode may be mounted in the container such that the electrode is not in contact with the container, but is mounted in the container such that it is suspended in the container.

Reagents may be supplied to and/or removed from a system using a commonly known transport device. The nature of the reagent delivery may vary with the type of fuel and/or the type of device. For example, solid, liquid, and gaseous reagents may all be introduced in different manners. The reagent transport device may be a gas or liquid conduit such as a pipe or hose which delivers or removes fuel, such as hydrogen gas or methane, from the system and/or from the reagent storage device. Alternatively, the system may comprise a movable gas or liquid storage container, such as a gas or liquid tank, which may optionally be physically removed from the system after the container is filled with reagent.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

The term "heteroalkyl" is given its ordinary meaning in the art and refers to alkyl groups as described herein in which one or more atoms is a heteroatom (e.g., oxygen, nitrogen, sulfur, and the like).

The term "aryl" is given its ordinary meaning in the art and refers to single-ring aromatic groups such as, for example, 5-, 6- and 7-membered single-ring aromatic groups.

The term "heteroaryl" is given its ordinary meaning in the art and refers to aryl groups as described herein in which one or more atoms is a heteroatom (e.g., oxygen, nitrogen, sulfur, and the like). Examples of aryl and heteroaryl groups include, but are not limited to, phenyl, pyrrolyl, furanyl, thiophenyl, imidazolyl, oxazolyl, thiazolyl, triazolyl, pyrazolyl, pyridinyl, pyrazinyl, pyridazinyl and pyrimidinyl, and the like. It should be understood that, when aryl and heteroaryl groups are used as ligands coordinating a metal center, the aryl and heteroaryl groups may have sufficient ionic character to coordinate the metal center. For example, when a heteroaryl group such as pyrrole is used as a nitrogen-containing ligand, as described herein, it should be understood that the pyrrole group has sufficient ionic character (e.g., is sufficiently deprotonated to define a pyrrolyl) to coordinate the metal center. In some cases, the aryl or heteroaryl group may comprise at least on functional group that has sufficient ionic character to coordinate the metal center, such as a biphenolate group, for example.

As used herein, the term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" group must still comprise the phenyl moiety and cannot be modified by substitution, in this definition, to become, e.g., a cyclohexyl group. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, lower alkyl, lower aryl, lower aralkyl, lower cyclic alkyl, lower heterocycloalkyl, hydroxy, lower alkoxy, lower aryloxy, perhaloalkoxy, aralkoxy, lower heteroaryl, lower heteroaryloxy, lower heteroarylalkyl, lower heteroaralkoxy, azido, amino, halogen, lower alkylthio, oxo, lower acylalkyl, lower carboxy esters, carboxyl, -carboxamido, nitro, lower acyloxy, lower aminoalkyl, lower alkylaminoaryl, lower alkylaryl, lower alkylaminoalkyl, lower alkoxyaryl, lower arylamino, lower aralkylamino, lower alkylsulfonyl, lower -carboxamidoalkylaryl, lower -carboxamidoaryl, lower hydroxyalkyl, lower haloalkyl, lower alkylaminoalkylcarboxy-, lower aminocarboxamidoalkyl-, cyano, lower alkoxyalkyl, lower perhaloalkyl, lower arylalkyloxyalkyl, and the like.

U.S. Publication No. 20130058857, published Mar. 7, 2013, and U.S. Provisional Patent Application Ser. No. 61/528,449, filed Aug. 29, 2011, by Stern et al., are each herein incorporated by reference.

The following examples are intended to illustrate certain embodiments of the present invention, but do not exemplify the full scope of the invention.

EXAMPLE 1

This example describes a non-limiting system and/or method for affecting the pH of a solution. The system employed in depicted in FIG. 6 and described in the specification. For this experiment, a two-compartment flow cell with each compartment having approximately 20 mL of volume. One compartment contained a copper (Cu) electrode while the other contained a partially oxidized copper electrode. Partial oxidation was achieved via soaking the copper in a concentrated potassium hydroxide solution for several days. A black layer of copper oxide (CuO) was observed on the surface of the oxidized electrode. The two chambers were separated by a Nafion 117 membrane previously soaked in a potassium nitrate solution with a 20 cm² working area. The chamber was flushed with copious amount of deionized water then 0.1 molar potassium nitrate.

Figure 7:
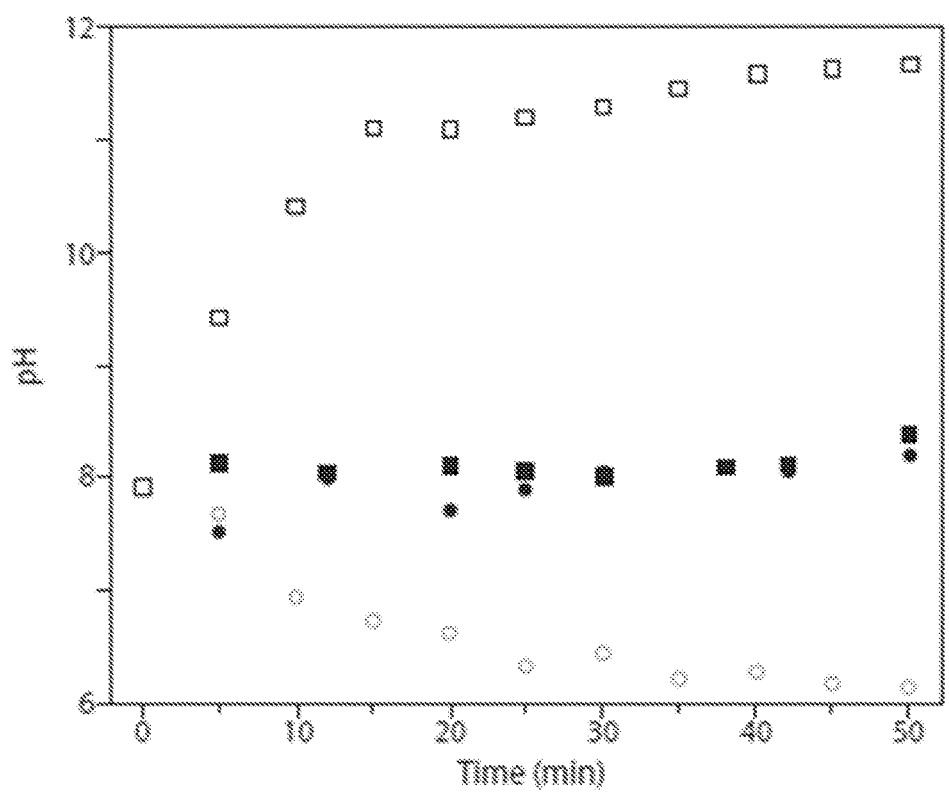
FIG. 7 plots pH measurements of an outlet stream as a function of time for a non-limiting system wherein no electrical potential was provided (solid markers) and wherein a 10 mA electrical potential was provided (open markers), wherein the complexation agent comprises copper, according to a non-limiting embodiment.

A 0.1 molar potassium nitrate solution was injected into both sides of the flow cell simultaneously at 1 mL/min in each side for 50 minutes. A 10 mA current (0.5 mA/cm² current density) was applied via a potentiostat to the system. Voltages increased to approximately 0.7 to 0.8 volts during the course of the experiment. Each outlet stream was fractionated into 5 mL samples and the pH of each fraction was measured and recorded. A plot of pH versus time based on the 5 mL fractionation of the two outputs can be seen in FIG. 7. Open squares represent the outlets from the CuO side (cathode) and open circles represent the outlet from the Cu side (anode). Filled squares and circles represent results from a control experiment done in a substantially similar manner except with no current applied between the anode and cathode.

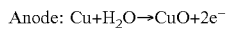
Anode: $Cu+H_2O \rightarrow CuO+2e^-$

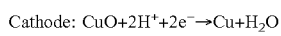
Cathode: $CuO+2H^++2e^- \rightarrow Cu+H_2O$

Figure 8:
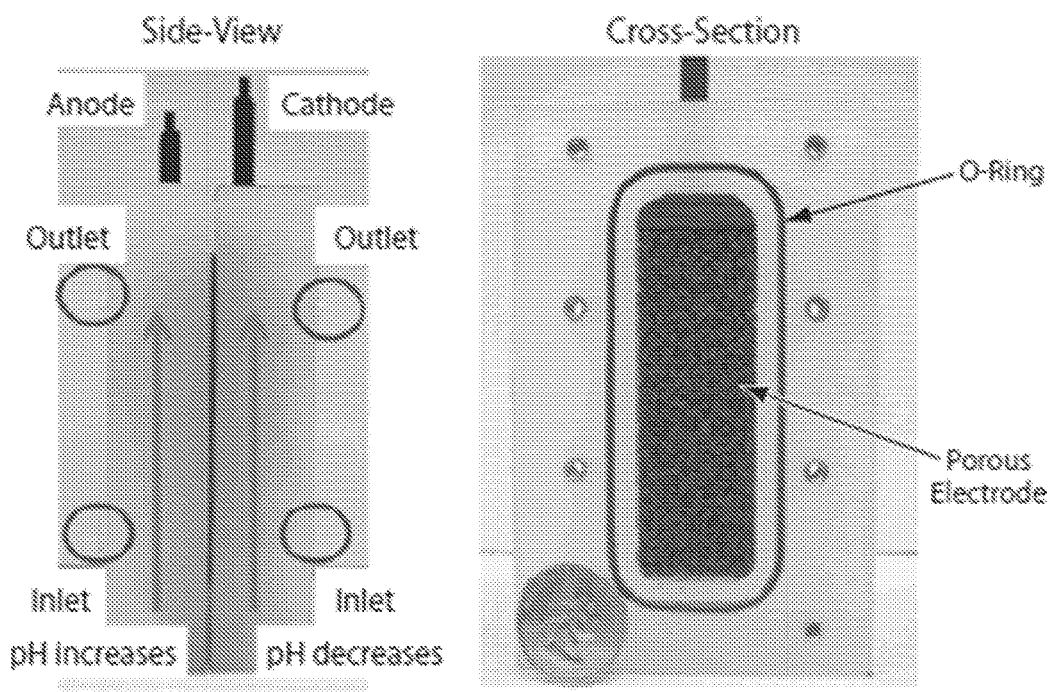
FIG. 8 shows photographs of a non-limiting system.

FIG. 8 shows photographs of the system used for this example. This system may find application for use the conversion of $CO_2$ (e.g., for capturing $CO_2$ from a gaseous stream containing a mixture of gases). In FIG. 8, syringe pumps are used to flow solution through both sides simultaneously in a co-current fashion. The outlet pH is measured over time (fractioned output). The o-rings are placed on both sides and allow for placement of a membrane between electrodes. The porous electrode could be coated with a heterogenous redox agent.

EXAMPLE 2

This example describes a non-limiting system and/or method for affecting the pH of a solution. For this experiment, a two-compartment flow cell with each compartment having approximately 20 mL of volume, each containing vitreous carbon foam electrodes, and being separated by a Nafion 117 membrane previously soaked in a concentrated sodium chloride solution was used. The chamber was flushed with copious amount of deionized water then 1 molar sodium chloride before being filled with the working solution. The working solution was contained 1 molar sodium chloride, 0.01 molar benzoquinone (BQ), and 0.01 molar hydroquinone ($BQH_2$).

The working solution was injected into both sides of the flow cell simultaneously at 1 mL/min in each side for 40 minutes. A 10 mA current (0.5 mA/cm² current density) was applied via a potentiostat to the system. Voltages increased to approximately 0.3 to 0.5 volts during the course of the experiment. Each outlet stream was fractionated into 5 mL samples and the pH of each fraction was measured and recorded. A plot of pH versus time based on the 5 mL fractionation of the two outputs can be seen in FIG. 9a. FIG. 9b shows the voltage as a function of time during the experiment. The pH did not increase significantly in the cathode because of the rapid base-catalyzed degradation of the quinone species at high pH values. Evidence of such degradation could be seen by a distinct darkening of the cathode outlet and noticeable precipitate.

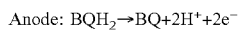
Anode: $BQH_2 \rightarrow BQ+2H^++2e^-$

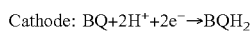
Cathode: $BQ+2H^++2e^- \rightarrow BQH_2$

Figure 9A:
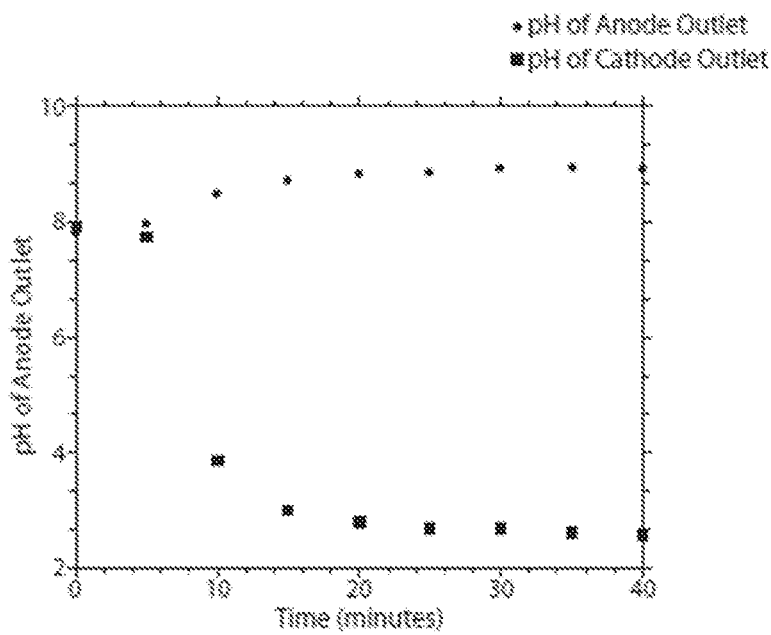
FIG. 9a shows a plot of outlet pH values of a system, wherein benzoquinone is converted into hydroquinone at the anode and hydroquinone is converted to benzoquinone at the cathode, according to a non-limiting embodiment.
Figure 9B:
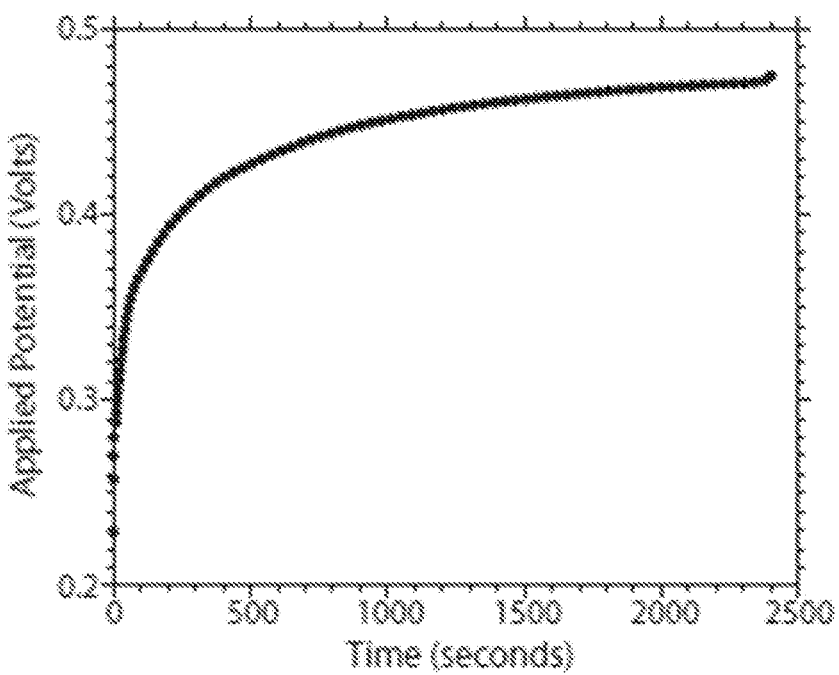
FIG. 9b shows a plot of the required potential to maintain a 10 mA current over the course of the experiment shown in FIG. 9a, according to a non-limiting embodiment.

In FIG. 9a: Plot of outlet pH values, where benzoquinone is converted into hydroquinone at the anode and hydroquinone is converted to benzoquinone at the cathode. In FIG. 9b: Plot of the required potential to maintain a 10 mA current over the course of the experiment. The increase in potential results from the increase in the difference of pH values between the two cells (e.g., as predicted by the Nernst Equation).

EXAMPLE 3

For this experiment, a two-compartment flow cell with each compartment having approximately 20 mL of volume, each containing lead (Pb) electrodes, which had been partially oxidized. Oxidation was achieved via a potentiostat that applied a 2.5 volt potential difference between the lead electrode and piece of platinum foil for several hours. A dark brown layer of lead dioxide ($PbO_2$) was observed on the outside of the electrodes. The two chambers were separated by a Nafion 117 membrane previously soaked in a concentrated sodium chloride solution with a 20 cm² working area. The chamber was flushed with copious amount of deionized water then 0.3 molar sodium sulfate to remove any remaining chloride ions.

Figure 10:
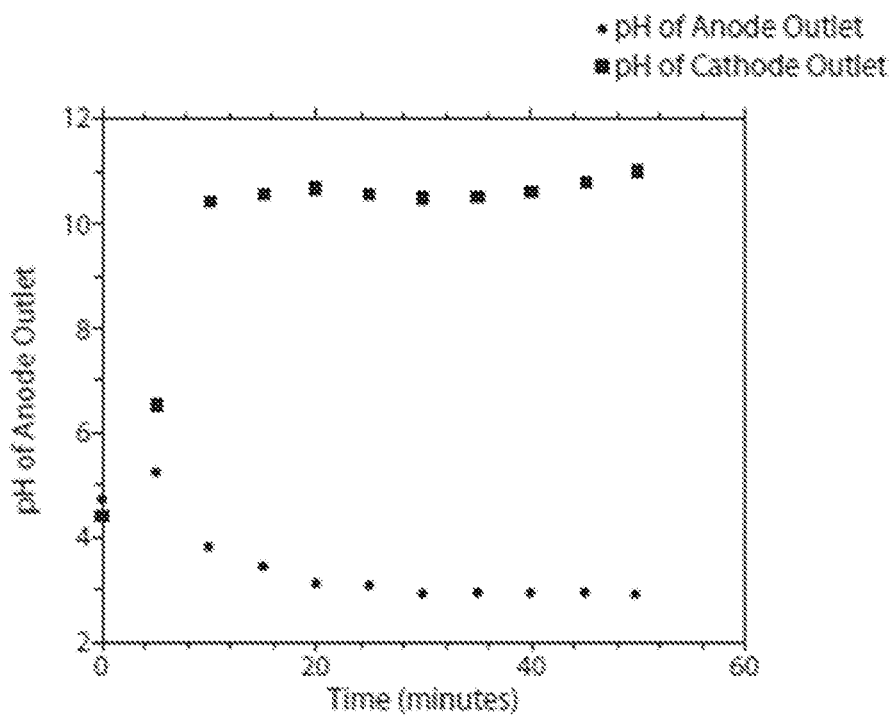
FIG. 10 shows a plot of outlet pH of a system, wherein lead is converted into lead dioxide at the anode and lead dioxide is converted to a mixture of lead and lead sulfate at the cathode, according to a non-limiting embodiment.
Figure 11:
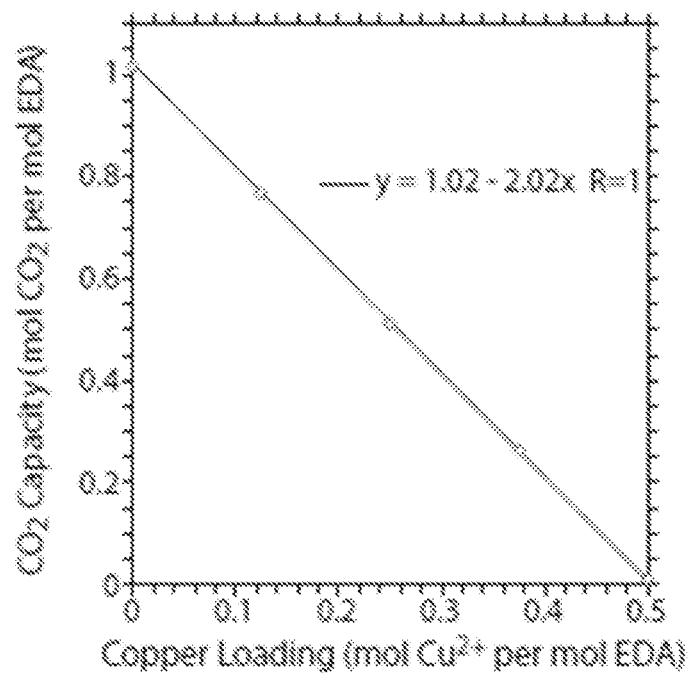
FIG. 11 shows a plot of $CO_2$ capacity per copper loading, according to a non-limiting embodiment.

A 0.3 molar sodium sulfate solution was injected into both sides of the flow cell simultaneously at 1 mL/min in each side for 50 minutes. A 10 mA current (0.5 mA/cm² current density) was applied via a potentiostat to the system. Voltages increased to approximately 2 volts to 3 volts during the course of the experiment. After the experiment, the anode showed significant quantities of lead dioxide and the cathode showed the presence of lead sulfate ($PbSO_4$), which indicates that the lead transformation, and not water hydrolysis, was the dominant electrochemical process during the experiment. Each outlet stream was fractionated into 5 mL samples and the pH of each fraction was measured and recorded. A plot of pH versus time based on the 5 mL fractionation of the two outputs can be seen in FIG. 10.

Anode: $Pb + 2H_2O \rightarrow PbO_2 + 4H^+ + 4e^-$

Cathode: $PbO_2 + 4H^+ + 4e^- \rightarrow Pb + 2H_2O$ and $PbO_2 + 4H^+ + SO_4^{2-} + 2e^- \rightarrow PbSO_4 + H_2O$ In FIG. 10: Plot of outlet pH wherein lead is converted into lead dioxide at the anode and lead dioxide is converted to a mixture of lead and lead sulfate at the cathode.

EXAMPLE 4

In this example, the $CO_2$ capacity of an ethylenediamine (EDA) solution was determined as a function of cupric nitrate ($Cu(NO_3)_2$) concentration, according to some embodiments. Experiments were conducted with an amine solution (40 mL) containing one molar ethylenediamine and one molar potassium nitrate with cupric nitrate concentrations ranging from 0 to 0.5 molar. The capacities were measured by contacting the amine solution with a 15% $CO_2$ (balance nitrogen) stream at 66 std. mL/min. The outlet composition of the gas was measured every 75 seconds with a gas chromatogram to determine how much $CO_2$ had been removed. Capacities were calculated after subtracting the dead volume of the system as calculated by running the experiment with a 1 M potassium nitrate solution with no amine.

These results demonstrate that, in some embodiments, the $CO_2$ capacity can be changed from equimolar with the ethylenediamine to near zero capacity at copper loadings of 0.5 mol $Cu^{2+}$ per mol EDA by changing the concentration of cupric ions in the solution. From this data, it can be determined that by electro-dissolution of a copper electrode, $CO_2$ can be released from an amine solution. In addition, electro-deposition of the copper back onto the electrode may regenerate the solution's $CO_2$ capacity.

EXAMPLE 5

Prophetic

Figure 12A:
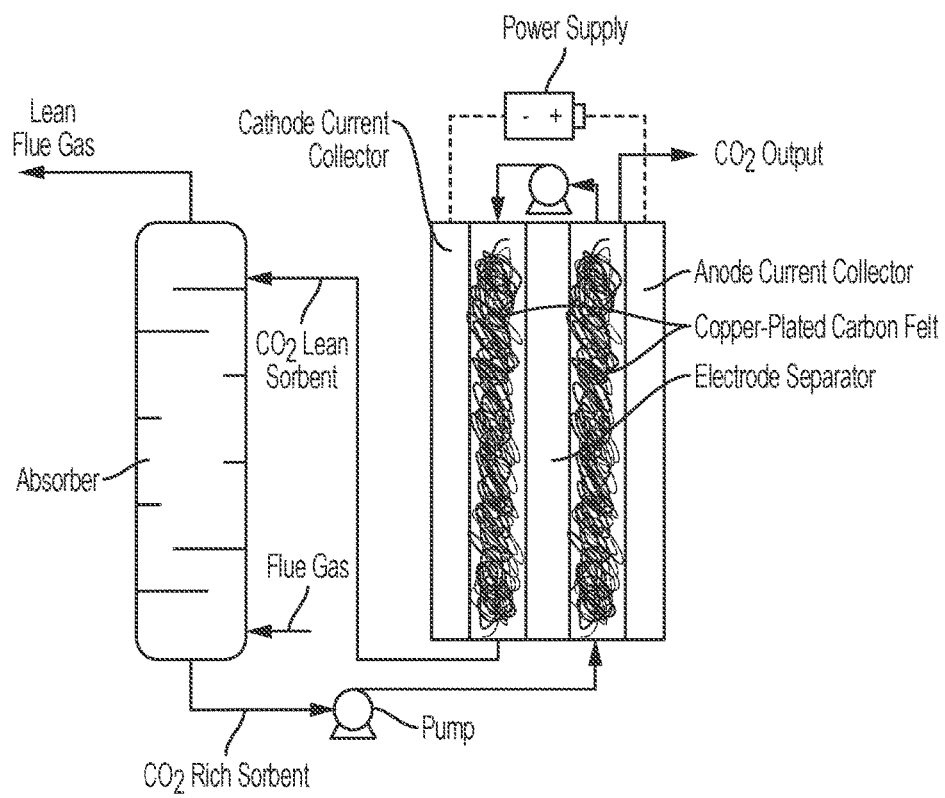
FIG. 12a and FIG. 12b show a diagram and a photograph, respectively, for a system for capturing $CO_2$, according to some embodiments.
Figure 12B:
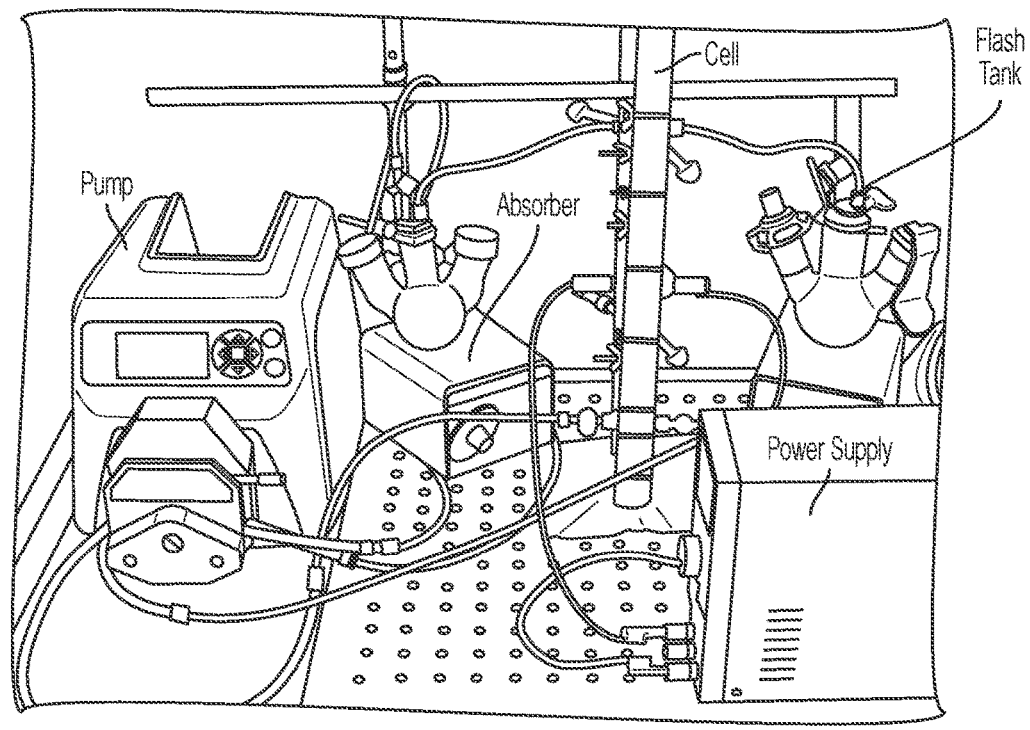

An aqueous ethylenediamine (e.g., 4 M), sodium chloride (e.g., 2 M), and cupric chloride (e.g., 1 M) working solution may be used to capture carbon dioxide from post-combustion flue gases of a fossil-fuel boiler or furnace. Particulates, sulfur oxides, and nitrogen oxides may be scrubbed before contact with the amine scrubbing system. The scrubbing system may contain an absorber similar to that which is currently used for acid gas scrubbing with amines. In some embodiments, in place of a thermal stripper, the saturated amine solution, containing dissolved carbon dioxide, may be pumped (e.g., at ten atmospheres of pressure) into an anode compartment of an electrochemical flow cell (e.g., see FIGS. 12a and 12b). A compartment (e.g., one centimeter thick) may be packed with a copper-plated carbon felt. The felt may be similar to carbon felt used in vanadium redox-flow batteries. Several cells may be stacked electrically in series, which may minimize the current and increase the voltage. A potential (e.g., 0.25 volts) may be applied to the anode (e.g., with respect to the cathode), which may cause the electro-dissolution of the copper on the carbon felt. This would react with the diamines and release the carbon dioxide from the solution. The gas bubbles would travel to the top of the flow cell and be directed towards a series of compressors. The now copper-loaded working solution may exit the anode and be pumped into the cathode. The anode and cathode may be separated by a thin ion-permeable separator. The cathode may be packed with a copper-plated carbon felt similar to the anode. In some embodiments, e.g., operated with a potential of about -0.25 volts (with respect to the anode), copper would be electro-deposited on the cathode thus removing it from the working solution. The current density of this system through the separator would be about 500 A/m². The solution leaving the cathode may then be released into the absorber, thereby completing the cycle. The electrochemical system may be operated at a suitable temperature (e.g., an average temperature of about 65° C.).

EXAMPLE 6

The following example describes non-limiting systems and methods for $CO_2$ capture and related energy efficiency of these systems.

In this example, an analysis of the energy consumption of the electrochemical process is provided, based on kinetic experiments results. This analysis serves to explain the energy landscape of the process, to highlight its advantages and to create a roadmap for future development and research needs.

The following abbreviations are employed in this example:
$C_j^{bulk}$ Bulk concentration of species i
F Faraday's constant
$\Delta G$ Gibbs free energy of reaction
$\Delta H$ Enthalpy of reaction
i Current density (A/m²)
K Equilibrium constant for $CO_2$/amine complexation
R Universal Gas Constant
$\Delta S$ Entropy of reaction
T Temperature (K)
$P_a$ Partial pressure of $CO_2$ on the anode side of the electrochemical cell
$P_F$ Partial pressure of $CO_2$ in the flue gas
$u_x$ Flow velocity of fluid in the direction perpendicular to the electrodes
$v_j$ Stoichiometric coefficient of species i
$w_{CO_2}$ Work of capture per mole of $CO_2$ Theoretical Basis and Experiments In this section, energy consumption and losses of the electrochemical capture process are outlined, with a brief discussion of relevant models and experiments required to estimate and measure these losses.

Figure 13A:
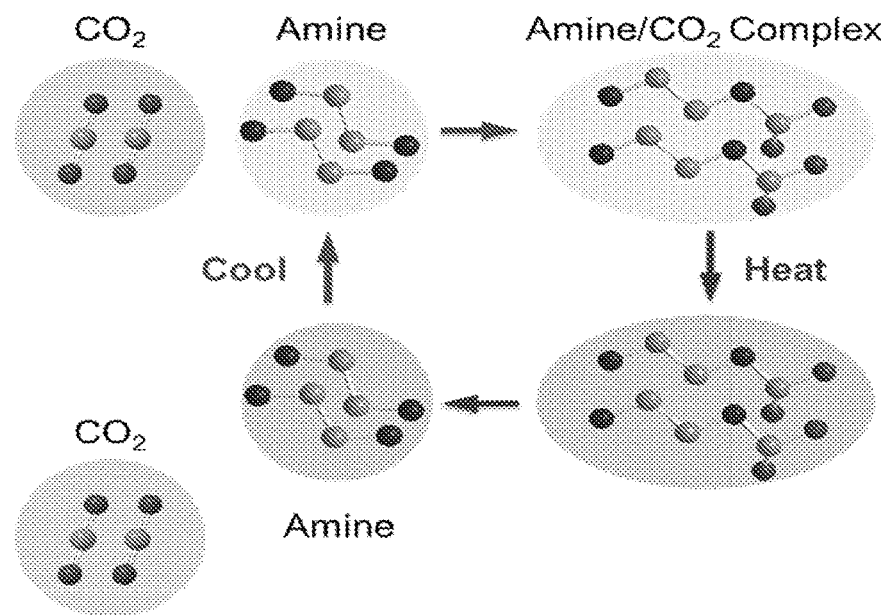
FIG. 13a shows a non-limiting example of a schematic of the thermal amine stripping process, according to some embodiments.

Thermodynamics: The thermodynamics of capturing $CO_2$ with amine sorbents are favorable due to the attractive forces between the basic amine molecules and the acidic dissolved $CO_2$. However, the stability of the amine-$CO_2$ complex poses a significant challenge for large-scale CCS during solvent regeneration. The thermal absorption and stripping cycle shown in FIG. 13(a) relies in part on an increase in entropy, driven by the addition of heat, to raise the temperature of an aqueous amine-$CO_2$ complex solution. As the entropic component of the Gibbs free energy increases, it may dominate the enthalpic interactions between the amine and $CO_2$ molecules, reducing the complexed fraction as measured by the equilibrium constant of the amine/$CO_2$ complex. This effect can be summarized by the relationship:

$$\Delta G^0 = \Delta H^0 - T\Delta S^0 = -RT \ln K$$

The released $CO_2$ is of high purity, and the regenerated amine from the stripper generally is cooled down before it returns to the absorber, usually in a heat exchanger with the cooler stream from the absorber, which is itself heated by this exchange before entering the stripper. However, even with significant heat recovery, the thermal amine stripping process can consume large amounts of energy, more than 50 kJ of electrical energy equivalent per mole of $CO_2$ captured and compressed. The fundamental nature of the stripping process and its reliance on an increase in entropy can result in that high consumption.

In contrast, the electrochemically-mediated amine regeneration process relies in part on competitive complexation of amines by Lewis acids that can cycle between active and inactive states under the action of electric voltage. In one non-limiting embodiment of this process, metal ions capable of strongly chelating amine molecules are formed from a metal surface under anodic current. The affinity of amines for the formed metal ions can allow for rapid release of $CO_2$ and formation of amine/metal ion complexes. For example, the stability constant of the copper complex with ethylenediamine (EDA) is on the order of $10^{18}$.

Figure 13B:
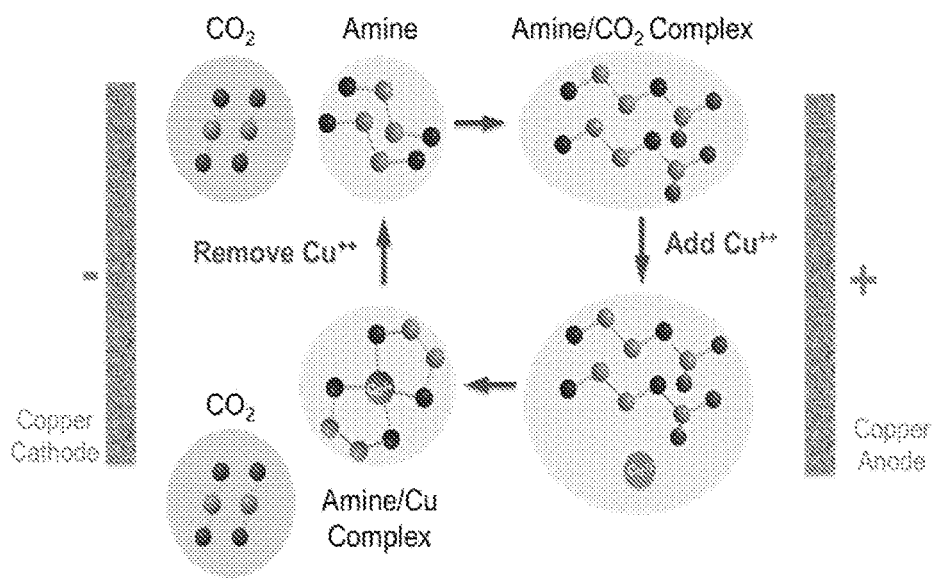
FIG. 13b shows a non-limiting example of a schematic of an example of a electrochemical amine regeneration process comprising copper, according to some embodiments.
Figure 14:
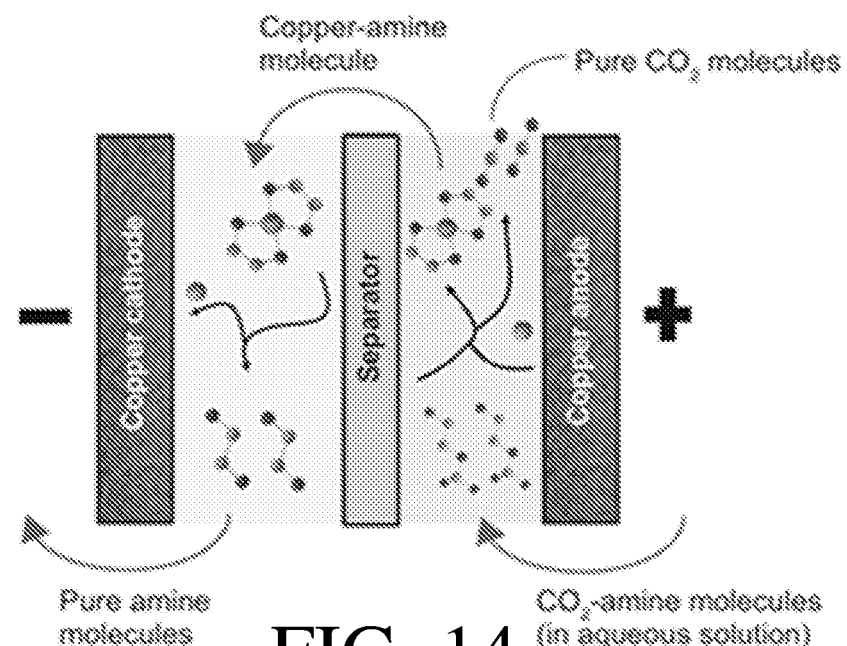
FIG. 14 shows a non-limiting schematic of an electrochemical system, according to some embodiments.

Under a cathodic current, the metal ions can be reduced to metal atoms, deposited onto a cathode surface, and regenerating the amine solvent for recycling into the absorber. Thus, instead of relying in part on an increase in entropy to separate amines from $CO_2$, the electrochemical process introduces a more favorable enthalpic interaction. FIGS. 13-14 contrast the thermal and electrochemical processes at the molecular scale.

In FIG. 13: (a) A molecular schematic of the thermal amine stripping process. An amine solvent at low temperature captures $CO_2$ from a gaseous mixture to from a complex, which is then dissociated at high temperature to regenerate the solvent. (b) A simple molecular schematic of an example of the electrochemical amine regeneration process. An amine solvent at low temperature captures $CO_2$ from a gaseous mixture to from a complex. The complex is then dissociated by competitive complexation by a metal ion formed by oxidation of a metal electrode. After the released gaseous $CO_2$ is separated from the aqueous solution, the metal ions are removed from the amine complex by electrochemical deposition on the surface of the metal electrode.

The thermodynamic work of capture in the electrochemical process for an example system utilizing copper metal and ethylenediamine (EDA) can be computed from:

$$W_{CO_2} = RT \ln\left(1 + \frac{K_{CO_2} P_a}{P_O}\right)\left(1 + \frac{K_{CO_2} P_F}{P_O + K_{CO_2} P_F}\right)$$

Experimentally, the same quantity can be determined by measuring the open circuit potential for copper under both argon and $CO_2$-saturated environments and subtracting the two values. This open circuit voltage difference generally arises from the differences in copper ion concentration between the two identical electrodes under anodic ($CO_2$ rich) and cathodic ($CO_2$ free) conditions. The open circuit potential can thus be a measure of the energetic penalty of dissociating the copper-amine complex in the presence and absence of $CO_2$ Electrochemical Kinetics: FIG. 14. shows a molecular schematic of the dissolution and deposition processes in the electrochemical cell. On the anode side, the metal (in this case copper) is oxidized to form copper ions according to the half reactions:

$$Cu \rightarrow Cu^+ + e^-$$

$$Cu^+ = Cu^{2+} + e$$

For uncomplexed copper, experiments suggest that the first reaction is fast and the second step is rate determining. Once the copper ions are formed, the reaction with amines is generally rapid, driven by the large thermodynamic driving force, as evidenced by the high stability complex of the formed complex. $CO_2$ is then released by the amine molecules in gas form.

In FIG. 14: A schematic of the electrochemical cell component of the electrochemical amine recovery process. The right hand side of the cell depicts the anode section, where metal ions formed at the surface of the electrode chelate amine molecules and break their complex with $CO_2$. On the left hand side of the cell, metal ions are deposited on the metal surface in the cathode side of the cell.

The aqueous solution of the copper amine complex enters the cathode side of the electrochemical cell once the gaseous $CO_2$ is separated in a simple flash tank. A cathodic current reduces the copper from its amine complex to deposit copper atoms according to the reactions:

$$Cu^{2+}[Am]_2 + 2e^- \rightarrow Cu + 2[Am]$$

$CO_2$ capture in the context of power stations is generally large-scale; consequently, the feasibility of a $CO_2$ capture process is partly a function of its ability to operate at scale.

For an electrochemical process, a major metric of scalability is the current density at which the process can operate efficiently. The activation overpotentials represent the energetic penalty of operating a process at a rapid rate of reaction, as measured by the current density. A scalable electrochemical process is ideally able to operate at high current densities (above 500 A/m$^2$) without requiring high overpotentials (e.g., no more than about 100 mV per electrode).

For the electrochemically-mediated amine regeneration process, both the dissolution and deposition of the metal ions is ideally facile if the process is to be feasible. To explore the prospects for effective modulation of copper deposition and dissolution in the presence of amines, galvanostatic pulse experiments were performed following the procedures described in Example 7. See also E. Mattsson and J. O. Bockris, "Galvanostatic Studies of the Kinetics of Deposition and Dissolution in the Copper+Copper Sulphate System," *Trans. Faraday Soc.*, vol. 55, p. 1586-1601, 1959, herein incorporated by reference.

Transport: Transport overpotentials generally represent energy losses due to the concentration difference between the bulk solution and the electrode surface in an electrochemical system. That concentration difference is usually a result of diffusion limitations of ions to the electrodes. An analysis of the performance of a flat plate electrode system for the electrochemical process was based on an integral solution to the partial differential diffusion equation, based on the assumptions of fully developed parabolic flow between two parallel, infinitely wide plates. The surface flux due to the formation of copper ions or the consumption of copper-amine complexes was captured by the Butler-Volmer equation. The equations describing the transport for each species i can be written as:

$$u_x \frac{\partial C_j}{\partial x} = D_j \frac{\partial^2 C_j}{\partial y^2}$$

with the boundary conditions:

$$C_j(x=0, y) = C_j^{bulk}$$

$$\left.\frac{\partial C_j}{\partial y}\right|_{y=0} = -v_j \frac{i}{nFD_j}$$

$$\left.\frac{\partial C_j}{\partial y}\right|_{y=H} = 0$$

where $u_x$ is the flow velocity in the direction parallel to the electrode, $D_i$ is the diffusion coefficient of species i, $C_j^{bulk}$ is the inlet concentration of the electrochemically active species, $v_i$ is the stoichiometric coefficient of the corresponding species, x=0 represents the inlet zone, y=0 represents the electrode surface, y=H represents the center line between the plates, which is where the separator is located. The first boundary condition represents the inlet conditions; the second describes the flux at the surface, while the third describes the zero flux across the separator condition.

For the porous electrode systems, a volume-averaged approach was utilized with the assumption of perfect mixing in the direction normal to the flow.

Compression and Pumping: In order to transport captured $CO_2$ to its final location for sequestration in saline formations, for enhanced oil recovery, or for utilization in other ways, it may be necessary to be compressed to around 150 bars. The theoretical energy (assuming an ideal compressor) required to compress $CO_2$ at ambient conditions to 150 bars is around 10 kJ per mole $CO_2$ compressed. Assuming a compressor efficiency of around 65%, compression energy around 15 kJ of electrical energy equivalent per mole of $CO_2$ compressed may be reached.

For the thermal amine stripping process, $CO_2$ desorption from amines generally occurs at pressures close to atmospheric pressure. A further increase in pressure may increase the $CO_2$ partial pressure and consequently, render desorption harder. One of the main advantages of the electrochemical process is its ability to desorb $CO_2$ under high pressure, since the dissociation kinetics of $CO_2$ from amines under the action of metal ions are fast and driven by a large thermodynamic force (due to the strong amine affinity for the metal ions). Consequently, and based on previous analysis of irreversible losses due to the re-absorption of $CO_2$ in the solution under the higher desorption pressure, the energy consumption of the electrochemical process under pressures up to 10 bars did not significantly change with the increase in pressure.

Here, the energy savings due to operating desorption at higher pressures by calculating the work of compression from the desorber pressure is estimated to be 150 bars using the Peng-Robinson equation of state as a first approximation, and including the pumping energy consumption of the aqueous solution up to the desorber pressure.

Results and Discussion

For the electrochemical process, experimental results and thermodynamic models have suggested that the minimum energy consumption for cycling copper in the presence and absence of $CO_2$ can be as low as 15 kJ per mole of $CO_2$ captured. Under different electrolytes, experimental measurements of open circuit potential under 50% copper loading and a temperature of 25° C. (Table 1) yielded values of around 250 mV, while lower open circuit potentials were possible by going to slightly higher temperatures (around 55° C.).

TABLE 1

Open circuit potential title measurements (+/−0.02 V) under different electrolytes for the copper-EDA system at 25° C. and 50% copper loading demonstrate energy consumption for separation of 250 mV.

|  | NaNO$_3$ | NaCl | NaBr |
| --- | --- | --- | --- |
| Argon | 0.47 | 0.47 | 0.48 |
| CO$_2$ | 0.20 | 0.23 | 0.23 |

Activation overpotentials for the copper-EDA system under nitrate electrolytes were found to be around 200 mV for anodic dissolution and 100 mV for cathodic deposition for a high current density of 1000 A/m² at 55° C. Under these conditions, the energy required to run the electrochemical process at industrially feasible rates would be around 50 kJ of electrical energy equivalents per mole of $CO_2$ captured, not including transport overpotentials or compression energy.

Figure 15:
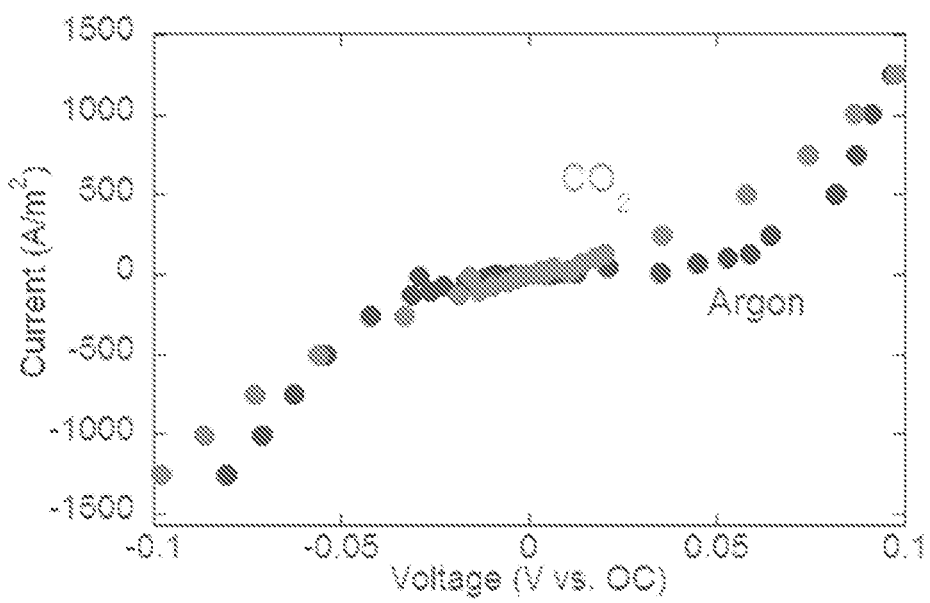
FIG. 15 shows a current-voltage profile for a copper-2M EDA system measured using galvanostatic pulses in the presence and absence of $CO_2$, according to some embodiments.

The effect of electrolyte additives has been found to reduce activation overpotentials significantly. FIG. 15 shows the voltage-current profile in the presence and absence of $CO_2$ under sodium bromide. The overpotentials required were as low as 90 mV for anodic dissolution (under $CO_2$) and 80 mV for cathode deposition (under argon, representing the case where $CO_2$ is absent).

In FIG. 15: Current-voltage profile for 1M copper-2M EDA system at 55° C. measured using galvanostatic pulses in the presence and absence of $CO_2$. The overpotentials required for a high current density of around 1000 A/m² were significantly lower than in the baseline case of a nitrate electrolyte.

Estimation of the transport overpotentials calculated by the methods outlined above suggests that the flat plate electrode system may operate at less than 100 mV per electrode. To reduce transport overpotentials further porous electrodes could be utilized, which could require less than 50 mV per electrode for high current densities.

Estimation of compression and pumping energy required for to produce carbon dioxide at a pressure of 150 bars as required for transportation to sequestration sites demonstrate the advantages of operating the electrochemical desorption cell at higher pressures. On the assumption of 65% efficiency for both processes, with the anode operated at pressures above 9 bars, the total compression and pumping energy may be reduced from 15 kJ per mole to around 10 kJ per mole of $CO_2$ compressed to 150 bars.

The expected overall energy consumption of the electrochemical process by summation of the thermodynamic limit, the activation and transport overpotentials, and the compression and pumping energy may be estimated. Based on the estimates discussed above for the copper-EDA example system, the overall energy consumption by the activation overpotentials at high rates of reactions is around 20 kJ/mole, with further energy savings possible by choice of additives. Compression and pumping energy requirements for the process may be significantly minimized, as desorption can be done at high pressures may be dominated.

CONCLUSIONS

The analysis described in this example suggests that the electrochemical process at its current performance can operate at efficiencies comparable to, or higher than, those achieved with the thermal amine stripping process. The major losses in the process may be a result of the high activation overpotentials required to drive high current densities. Operation of the electrochemical cell at high pressures may result in significant energy savings, by reducing the compression energy requirements. The energetic advantages of the electrochemical process, along with its plug and play nature, promise lower carbon capture costs and simpler implementation.

EXAMPLE 7

Materials and Methods: The following example provides additional details regarding full methods and systems employed in Examples. Solutions were prepared with distilled and deionized 18 MΩ water (Milli-Q). All chemicals used were purchased from either Sigma-Aldrich or VWR. The background electrolytes used were sodium nitrate ($NaNO_3$, purity>99%), sodium chloride (NaCl, purity>99%), sodium bromide (NaBr, purity>99%), ammonium bromide ($NH_4Br$, purity>99%), ammonium chloride ($NH_4Cl$, purity>99%) and potassium chloride (KCl, purity>99%). Cupric ions were added to solutions through the addition of copper nitrate semi(pentahydrate) ($Cu(NO_3)_2$, purity>98%), copper sulphate ($CuSO_4$, purity>99%), or copper chloride ($CuCl_2$, purity>97%). All amines used were of at least 99% purity. Sulfuric acid solutions were prepared from a 2.5 M solution purchased from Sigma-Aldrich.

Electrochemical experiments were performed using a three electrode setup controlled by a Princeton Applied Science VersaStat 3 potentiostat. The working electrode was a 3.1 mm diameter rod of copper alloy 101 (99.99% copper). The length of the copper rod was sheathed by heat-shrink FEP insulation, which was then wrapped with a copper mesh that acted as the reference electrode. Another layer of insulation was placed around the reference electrode, which was covered by another layer of copper mesh that acted as the counter electrode. This construction was chosen to minimize uncompensated resistances between the reference and the working electrode by minimizing the distance between all the electrodes. The symmetrical design also promotes a uniform current density distribution on the electrode surface. The three electrodes were held in place by setting them in a modified number 4 rubber stopper.

Galvanostatic Pulse Experiments: The electrochemical kinetics of copper deposition and dissolution were investigated with constant-current pulses from 1250 A/m² to 0.25 A/m². Cathodic pulses were generally performed before anodic pulses.

Pulses were performed in order starting with the highest current densities. The length of a pulse was related to the current density. Experiments with current densities ≥125 A/m² had pulse lengths of 0.01 seconds. For pulses≤125 A/m², the total applied charge density was kept constant at 1.25 C/m². Therefore, lower current densities had progressively longer pulse lengths with a maximum length of 5 seconds for the 0.25 A/m² pulses.

Before a set of pulses was performed, the electrode was polished using 20 μm polishing paper. The electrode was then electroplated in the solution at 15 A/m² for 10 minutes. For experiments under inert atmosphere, argon was bubbled into the cell during both the pulsing and the electroplating steps. For experiments under $CO_2$, the solutions were saturated for 15 minutes prior to plating and the $CO_2$ was bubbled in for the duration of the plating and pulse experiments. All experiments used 10 mL of solution and were gently stirred. Temperature was controlled through submerging the electrochemical cell in a temperature regulated oil bath. For each pulse, 1000 data points were taken.

One condition, 1M EDA with 0.25M $Cu(NO_3)_2$ with 1M $NaNO_3$ under argon at 55° C., was repeated eight times. The standard deviation of a single experiment was approximately 20% of the average. Since most experiments were performed two or three times, this leads to a standard deviation of the reported averages of about 15% of the average are assumed.

Figure 16A:
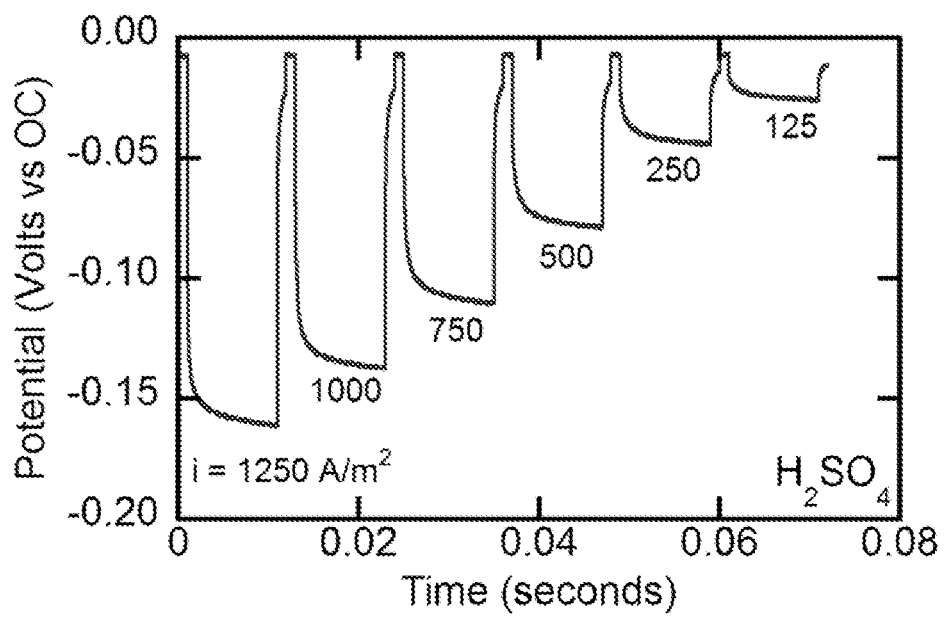
FIG. 16a shows current and potential as a function of time for a single galvanostatic pulse, according to some embodiments.
Figure 16B:
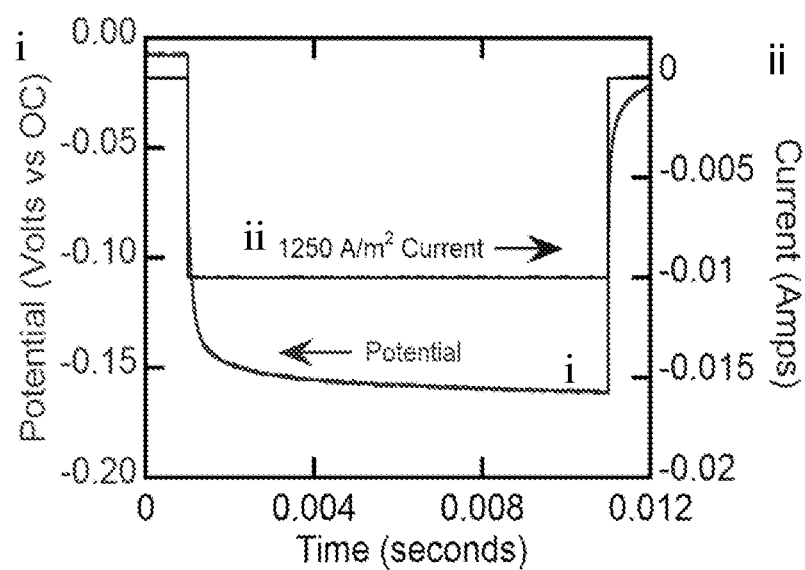
FIG. 16b shows Potential as a function of time for a series of galvanostatic pulses, according to some embodiments.

Dynamic Analysis of Pulse Experiments: The potential results from a series of cathodic pulses are shown in FIG. 16a. Near steady-state behavior was observed for each of these pulses after 10 ms. An example of the data obtained for a single constant current cathodic pulse is shown in FIG. 16b. During the first millisecond of the experiment, the change in potential is significant due to the solution resistance and double-layer capacitance.

In FIG. 16: a) Current and potential as a function of time for a single galvanostatic pulse. b) Potential as a function of time for a series of galvanostatic pulses from 1250 A/m² to 125 A/m². All pulses in a 0.5M $H_2SO_4$ and 0.25M $CuSO_4$ solution under argon at 55° C.

Figure 17:
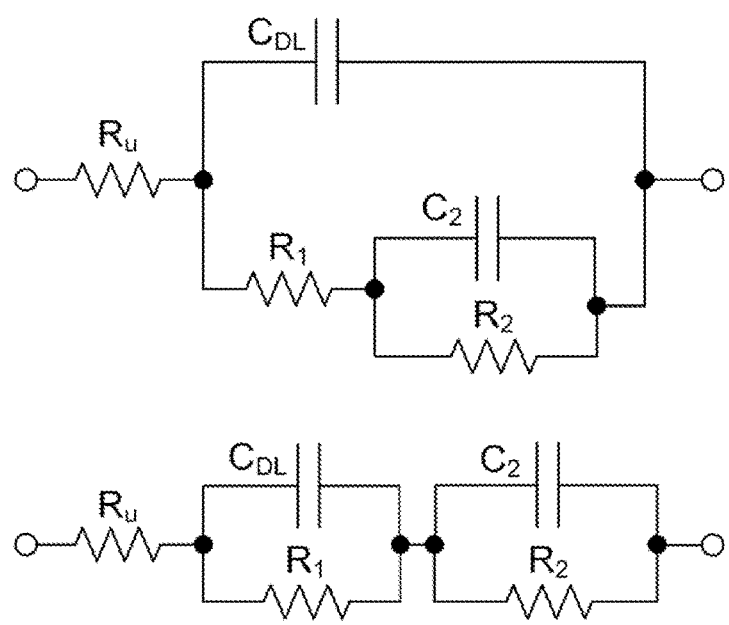
FIG. 17 illustrates equivalent RC circuits used to model the dynamic behavior of the galvanostatic pulses, according to some non-limiting embodiments.

The dynamics of the galvanostatic pulses were assumed to follow the RC circuit shown in FIG. 17. In this circuit, $R_u$ is the uncompensated resistance of the solution and $C_{DL}$ is the double layer capacitance. The resistances $R_1$ and $R_2$ account for the non-constant resistance of charge transfer for the electro-deposition or electro-dissolution reactions. $C_2$ can be thought of as the consumption or creation of either an intermediate species or an oxidized surface layer, which then leads to a change in the resistance (from $R_1$ to $R_1+R_2$) with a time constant of $\tau_2=R_2C_2$. This circuit was chosen because it models the commonly observed uncompensated resistance and double layer capacitance, while allowing the charge transfer resistance to be described by a sigmoidal function.

In FIG. 17: Equivalent RC circuits used to model the dynamic behavior of the galvanostatic pulses.

If it is assumed that $R_1C_{DL} \ll R_2C_2$, then we can safely decouple the two parallel RC elements can be decoupled resulting in the circuit of FIG. 16b. The voltage response for a constant current pulse of this circuit is $$\eta(t) = i[R_u + R_1(1 - e^{-\frac{t}{R_1 C_{DL}}}) + R_2(1 - e^{-\frac{t}{R_2 C_2}})] \tag{1.1}$$

The double layer capacitances are typically around $10^{-4}$ F/$cm^2$ with resistances on the order of 10Ω With an electrode of 0.08 $cm^2$, the middle term in Eq. 1 has an RC time constant of approximately 0.1 milliseconds. Therefore, at short times (below 0.05 millisecond), the uncompensated resistance and capacitive effects are dominant and the first and middle terms can be linearized to yield a linear dependence of voltage on time:

$$\eta(t \leq 50 \ \mu s) = i\left[R_u + \frac{t}{C_{DL}}\right] \qquad 1.2$$

Using Eq. 1.2, the uncompensated resistance and capacitance values for each set of pulses from the short time data for the pulses with current densities, i≥250 A/$m^2$ can be estimated. The short time linear resistances for a set of high current density pulses for a 1N $H_2SO_4$ solution with 0.25 M $CuSO_4$ at 55° C. was plotted. The linear fit showed excellent precision in the estimates of the uncompensated resistance (the y-intercept). Uncompensated resistance values obtained through this method agreed well with values measured with impedance spectroscopy.

For each pulse, the values of $R_1$, $R_2$, and $C_2$ were obtained by fitting Eq. 1.1 to the data, $R_u$ and $C_{DL}$ constant at their previously-estimated values.

The potentials demonstrated approach towards steady state during the 0.01 second pulses. The capacitive effects make an impact during the initial one or two milliseconds, and limitations due to diffusional transport were not observed even at 1250 A/$m^2$.

The pseudo steady-state overpotentials for each pulse, which will be used for all of the I/V results, were calculated by extrapolation of Eq. 1.1 to infinite time after subtraction of the uncompensated resistance, $$\eta(t \rightarrow \infty) = i(R_1 + R_2) \qquad 1.3$$

where $R_1$ and $R_2$ are obtained through the curve fitting procedure described above Consideration of Transport Limitations: To ensure operation within a non-transport limited regime, the limiting current density as a function of time was be calculated based on the similarity solution for semi-infinite diffusion. Eq. 1.4 shows the limiting current, $i_{Limit}$, which equals the limiting $Cu^{2+}$ flux multiplied by 2F.

$$i_{Limit} = 2F\left(\frac{D}{\pi t}\right)^{1/2} C_0 \qquad 1.4$$

Integration of Eq. 1.4 over time, yields the total charge transported during a pulse, $Q_{Limit}$, of a diffusion limited system as a function of the pulse length as shown in Eq. 1.5.

$$Q_{Limit} = 4F\left(\frac{Dt}{\pi}\right)^{1/2} C_0 \qquad 1.5$$

The copper ion complex diffusivity may be estimated by literature reports of copper sulfate diffusivity is water. Based on an estimated cupric ion complex diffusivity of $10^{-9}$ $m^2$/s and a copper concentration of 0.25M, the maximum ratio of charge transferred during a pulse to diffusion limited charge is 0.07 for the 1250 A/$m^2$ pulse. Experiments at low temperatures, which could have slower diffusivities, and experiments with different copper concentrations could have higher ratios; in general, it was assumed that transport limitations were not significant under these conditions.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for carrying out a pH-influenced chemical and/or biological reaction, comprising:
   a pH-adjustment zone comprising a solution and a porous electrode, wherein the solution contains a complexation agent capable of associating and/or disassociating an acid and/or base to and/or from the solution upon exposure to an electrical potential, and wherein at least a portion of the complexation agent intercalates into and/or de-intercalates from the electrode during operation of the system; and
   a reaction zone in fluid connection with the pH-adjustment zone, wherein the reaction zone comprises components and reagents for carrying out a pH-influenced chemical and/or biological reaction.

2. The system of claim 1, wherein the pH-influenced reaction involving the conversion of $CO_2$ to a dissolved species.

3. The system of claim 2, wherein the complexation agent comprises copper and the solution further comprises a primary amine.

4. The system of claim 1, wherein the solution further comprises at least one additive.

5. The system of claim 4, wherein the additive is a salt comprising the structure $[M]^{p+}[X]^-$ or $n[M]^{m+}m[X]^{n-}$, wherein $[M]p^+$ and $[M]^{m+}$ are cations, $[X]^{p-}$ and $[X]^{n-}$ are anions, each p is 1, 2, 3, or 4, and m and n are different and are 1, 2, 3, or 4.

6. The system of claim 5, wherein the additive comprises sodium bromide or ammonium bromide.

7. A method, comprising:
   providing a system comprising a pH-adjustment zone and a reaction zone in fluid connection with the pH-adjustment zone, wherein the pH-adjustment comprises a complexation agent and wherein the reaction zone comprises components and reagents for carrying out a pH-influenced chemical and/or biological reaction, and wherein the system comprises at least one porous electrode;
   exposing the complexation agent in the pH-adjustment zone to an electrical potential, wherein the complexation agent associates and/or disassociates an acid and/or base to and/or from the solution upon exposure to the electrical potential and causes the pH of the solution to increase or decrease, thereby forming a pH-selected solution having a selected pH, and wherein at least a portion of the complexation agent intercalates into and/or de-intercalates from the porous electrode during the exposing step; and
   flowing the pH-selected solution to the reaction zone, wherein the chemical and/or biological reaction is influenced by the pH of the pH-selected solution, and wherein the chemical and/or biological reaction causes the pH of the pH-selected solution to decrease or increase.

8. The method of claim 7, wherein the pH-influenced reaction involving the conversion of $CO_2$ to a dissolved species.

9. The method of claim 8, wherein the complexation agent comprises copper and the solution further comprises a primary amine.

10. The method of claim 7, wherein the solution further comprises at least one additive.

11. The method of claim 10, wherein the additive is a salt comprising the structure $[M]^{p+}[X]^-$ or $n[M]^{m+}m[X]^{n-}$, wherein $[M]p^+$ and $[M]^{m+}$ are cations, $[X]^{p-}$ and $[X]^{n-}$ are anions, each p is 1, 2, 3, or 4, and m and n are different and are 1, 2, 3, or 4.

12. The method of claim 11, wherein the additive comprises sodium bromide or ammonium bromide.

* * * * *

UNITED STATES PATENT AND TRADEMARK OFFICE
CERTIFICATE OF CORRECTION

PATENT NO. : 9,567,678 B2
APPLICATION NO. : 14/506384
DATED : February 14, 2017
INVENTOR(S) : Aly Eldeen O. Eltayeb et al.

Page 1 of 1

It is certified that error appears in the above-identified patent and that said Letters Patent is hereby corrected as shown below:

In the Claims

In Claim 5, at Column 34, Line 2, please replace "$[M]^{p+}[X]^-$" with -- $[M]^{p+}[X]^{p-}$ --

In Claim 5, at Column 34, Line 3, please replace "$[M]p^+$" with -- $[M]^{p+}$ --

In Claim 11, at Column 34, Line 46, please replace "$[M]^{p+}[X]^-$" with -- $[M]^{p+}[X]^{p-}$ --

In Claim 11, at Column 34, Line 47, please replace "$[M]p^+$" with -- $[M]^{p+}$ --

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*